US012289812B2

(12) United States Patent
Comeau

(10) Patent No.: US 12,289,812 B2
(45) Date of Patent: Apr. 29, 2025

(54) CURRENT-SPLITTER CIRCUIT FOR LED LIGHTING SYSTEMS

(71) Applicant: Alain Richard Comeau, Escondido, CA (US)

(72) Inventor: Alain Richard Comeau, Escondido, CA (US)

( * ) Notice: Subject to any disclaimer, the term of this patent is extended or adjusted under 35 U.S.C. 154(b) by 443 days.

(21) Appl. No.: 17/408,947

(22) Filed: Aug. 23, 2021

(65) Prior Publication Data

US 2022/0240358 A1 Jul. 28, 2022

Related U.S. Application Data

(60) Provisional application No. 63/140,772, filed on Jan. 22, 2021.

(51) Int. Cl.

| | |
|---|---|
| ***H05B 45/10*** | (2020.01) |
| ***H05B 45/325*** | (2020.01) |
| ***H05B 45/397*** | (2020.01) |
| ***H05B 45/46*** | (2020.01) |

(52) U.S. Cl.

CPC ......... *H05B 45/325* (2020.01); *H05B 45/397* (2020.01); *H05B 45/46* (2020.01)

(58) Field of Classification Search

CPC .... H05B 45/10; H05B 45/325; H05B 45/397; H05B 45/46; H05B 47/10

See application file for complete search history.

(56) References Cited

U.S. PATENT DOCUMENTS

| | | | | |
|---|---|---|---|---|
| 2010/0289426 A1* | 11/2010 | Takasaka | H05B 45/325 | 315/250 |
| 2012/0286753 A1* | 11/2012 | Zhong | H05B 45/46 | 323/312 |
| 2013/0300294 A1* | 11/2013 | Jungwirth | H05B 45/48 | 315/122 |
| 2014/0346962 A1* | 11/2014 | Sanders | H05B 45/3725 | 315/193 |

* cited by examiner

*Primary Examiner* — Jimmy T Vu

(57) ABSTRACT

A circuit and method of splitting or mirroring a primary current into multiple branches, nominally four, such that the current in each branch does not exceed a given maximum value, nominally 700 mA, and having good current-matching performance given a relatively high-frequency PWM input signal, on the order of 1 kHz, for use in a high-efficiency LED lighting system.

24 Claims, 14 Drawing Sheets

(FIG. 13)

CURRENT-SPLITTER CIRCUIT FOR LED LIGHTING SYSTEMS

CROSS REFERENCE TO RELATED APPLICATION

This application claims the benefit of U.S. Provisional Application No. 63/140,772, filed Jan. 22, 2021, the contents of which are incorporated herein.

TECHNICAL FIELD

The invention relates to electric circuits, specifically switching circuits and methods for splitting current at high frequencies, including cascoded transistor arrangements.

BACKGROUND OF THE INVENTION

In electronics, transistors are circuit elements which use an electric field to control a flow of current. They include bipolar junction transistors (BJTs) and field-effect transistors (FETs) which are unipolar. A common type of FET used is the metal-oxide-semiconductor field-effect transistor (MOSFET). In typical operation a BJT allows a small amount of current applied at its base lead to control a much larger flow of current between its emitter and collector leads. Similarly, a FET allows a voltage applied to its gate terminal to control current flow between its source and drain terminals. These characteristics of transistors are useful in building amplifying or switching circuits. BJTs being bipolar, both electrons and electron holes are used as charge carriers. An abundance of either carrier can be created in a semiconductor, leading to p-type having electron holes and n-type having mobile electrons. BJTs can be arranged in PNP or NPN configurations.

One drawback of some single-stage amplifiers is that they are subject to the Miller effect, which is the increased effective capacitance seen by inverting amplifiers such as common-emitter or common-source amplifiers, built with BJTs or FETs, respectively. The Miller effect reduces the bandwidth of such amplifiers by degrading performance at high frequencies. One arrangement used to mitigate the Miller effect is a two-stage amplifier called a cascode, which consists of a common-emitter stage feeding into a common-base stage if built with BJTs or a common-source stage feeding into a common-gate stage if built with FETs. The purpose of the cascode is to improve input-output isolation, reducing feedback and improving stability and bandwidth.

A circuit for splitting high-voltage currents with a wide bandwidth is disclosed in U.S. Pat. No. 10,615,132, issued to the current inventor, but would consume too much power for the application at hand and must be substantially modified. Referring to FIG. 1, the approach used in U.S. Pat. No. 10,615,132 is branches of cascoded elements, such as the cascode linking elements X14 and M4, to ensure high-voltage capability and current accuracy. Elements M1, M2, M3 and M4 of FIG. 1 are MOSFET transistors in common gate configurations with a primary leg to perform current mirroring. Diodes 106A-106D are biased such that the lowest drain potential will determine the gate voltage.

What is desired is a low-cost circuit and method to split currents of about 100 mA-5 A into a plurality of branches with low power consumption and sufficient bandwidth to accommodate a pulse-width modulated (PWM) signal with a base frequency in the kHz. The invention provides such a solution.

SUMMARY OF THE INVENTION

The invention is a low-cost, low-power circuit and method of splitting a primary current into multiple branches, nominally four, such that the current in each branch does not exceed a given maximum value and having good performance given a relatively high-frequency PWM input signal, for use in a high-efficiency LED lighting system. The circuit and method improve on the circuit and method disclosed in U.S. Pat. No. 10,615,132 by the present inventor. Specifically, the invention comprises a plurality of branches, each further comprising a plurality of LED elements, coupled to each other in a current-mirroring arrangement. Multiple implementations of the concept are presented as different embodiments of the invention and variations on the same.

The invention minimizes power loss by ensuring saturation of one of the bipolar transistors acting as self-biased current mirrors. The invention demonstrates power loss on the order of 100-200 mW per branch when said branch is subjected to current of ~500-1000 mA. The invention can be scaled up or down to perform similar tasks at smaller or higher currents. Other applications than LED string lighting systems are equally possible. The invention allows for efficiencies greater than 99% in systems where stringed LED voltages are ~40V.

To those skilled in the art to which this invention relates, many changes in construction and widely differing embodiments and applications of the invention will suggest themselves without departing from the scope of the invention as defined herein. The disclosures and the descriptions herein are purely illustrative and are not intended to be in any sense limiting.

BRIEF DESCRIPTION OF THE DRAWINGS

For a better understanding of the invention including the features, advantages and specific embodiments, reference is made to the following detailed description along with accompanying Figures, in which.

DETAILED DESCRIPTION OF A PREFERRED EMBODIMENT

While the making and using of the disclosed embodiments of the invention is discussed in detail below, it should be appreciated that the invention provides many applicable inventive concepts which can be embodied in a wide variety of specific contexts. Some features of the preferred embodiments shown and discussed may be simplified or exaggerated for illustrating the principles of the invention.

The invention is a circuit and method to split a primary current of 2400 milliamps (mA) into 4 branches of 600 mA each such that no branch current ever exceeds 700 mA. The circuit and method can be extended to primary currents between 100 mA to 5 Amperes (A). The immediate application of said circuit is to power a plurality of light emitting diodes (LED) on each branch. Said circuit and method must be capable of handling pulse-width modulated (PWM) signals with frequencies in the kHz range and pulse width in the uSec range.

Figure 1:
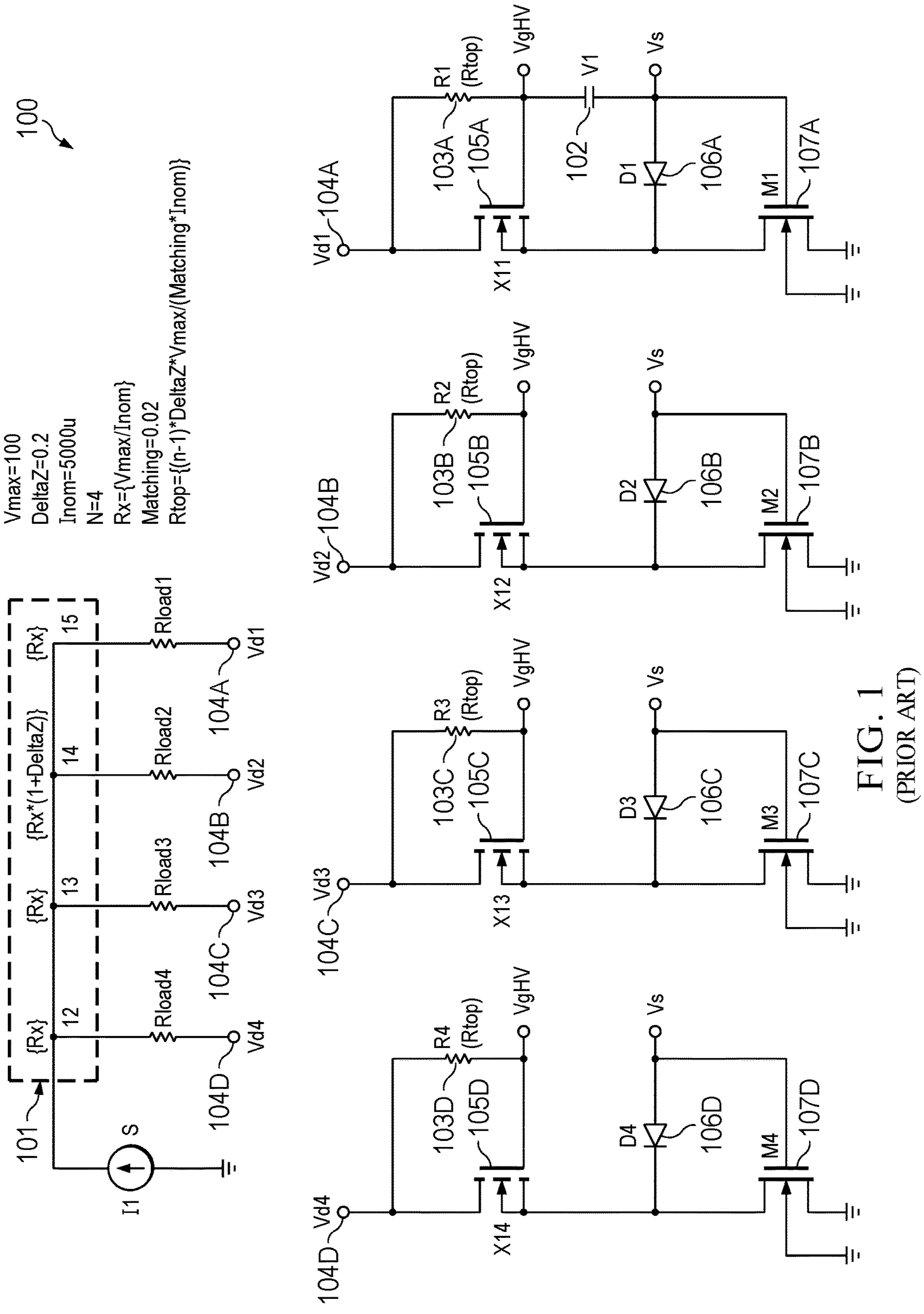
FIG. 1 (PRIOR ART)
FIG. 1 illustrates a high-voltage current splitter (prior art)

In the invention, currents are on the order of 1 A so the circuit disclosed in FIG. 1 can be improved by using BJTs to perform the primary current mirroring function. Bipolar transistors have properties which are conducive to the goal of a low-power current splitter, namely: their ability to conduct large currents at low collector voltages, intrinsically good matching and tighter base-to-emitter voltage ($V_{be}$) distributions compared to MOSFETs' gate-to-source voltage ($V_{gs}$) distributions.

Figure 2:
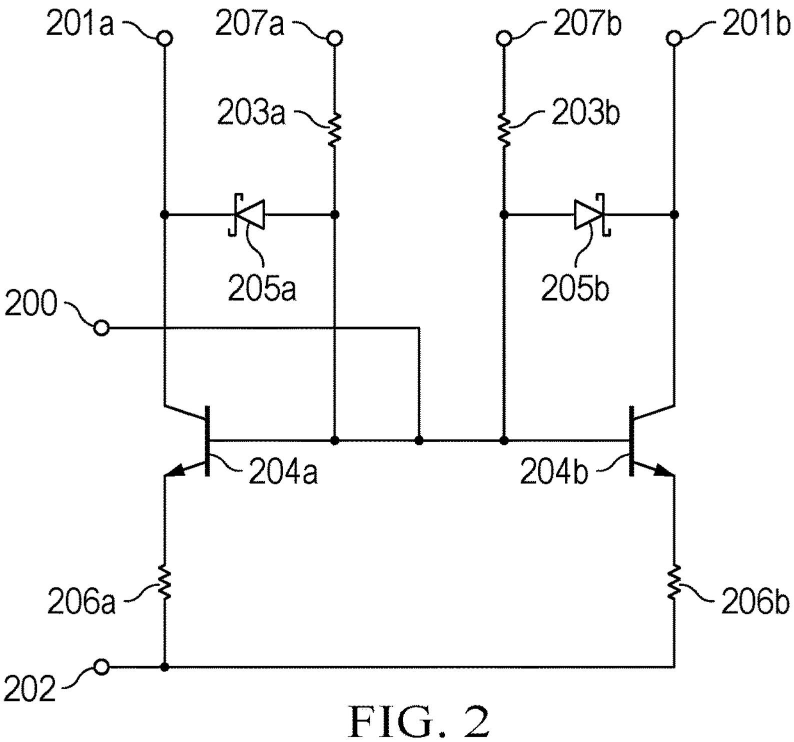
FIG. 2 is a low-power current-matching circuit using bipolar transistors and Schottky diodes, in a first embodiment of the invention.
Figure 4:
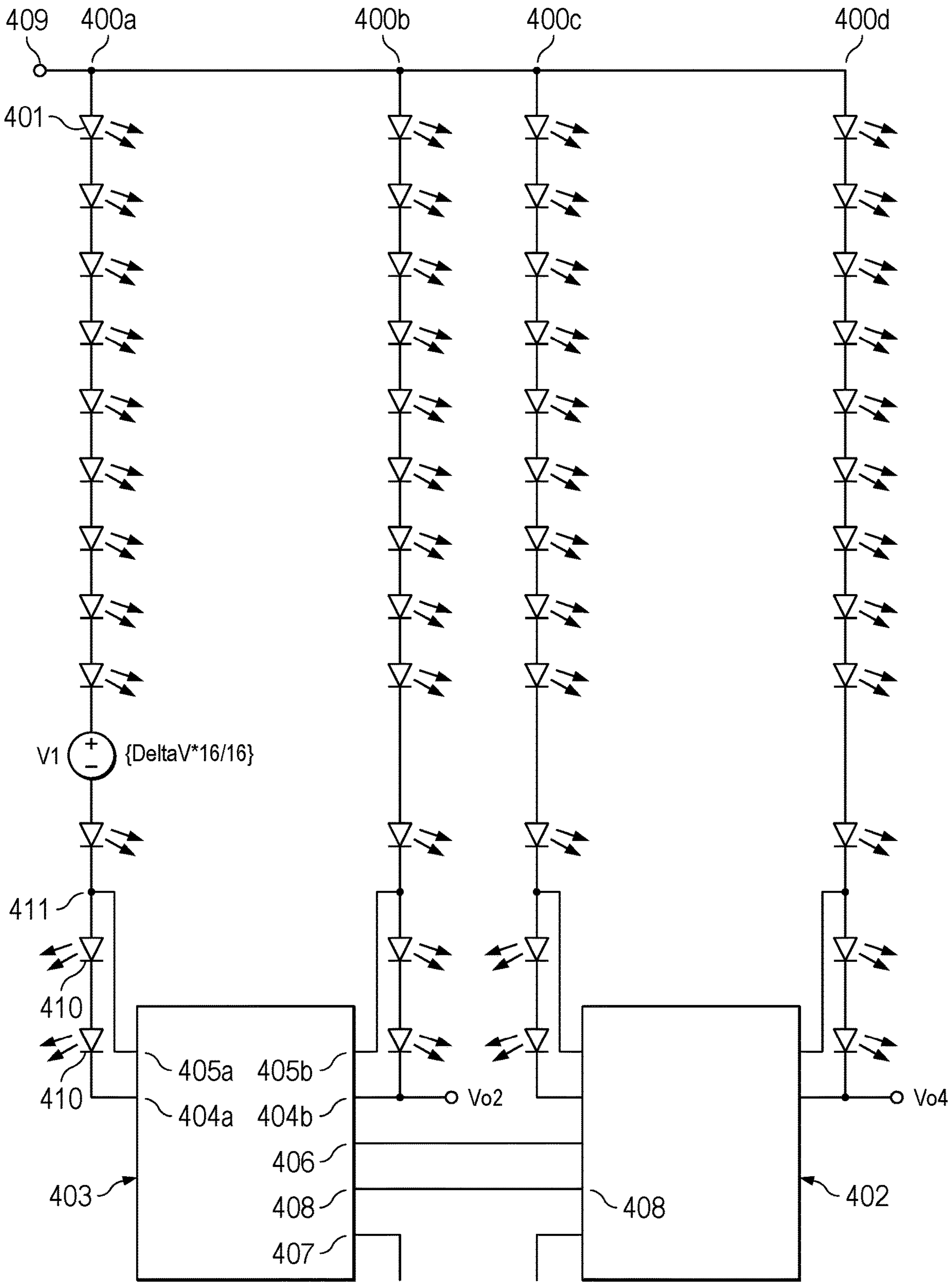
FIG. 4 is an expanded view of a circuit similar to that of FIG. 2 showing the full branches, LED elements, and an additional stage, in a first embodiment of the invention.

FIG. 2 shows a low-power current splitter stage consisting of two current splitters built using BJTs and Schottky diodes as a first embodiment of the invention. Referring to FIG. 2, additional identical stages would be connected at 200; 201*a* and 201*b* lead to branch A and branch B, respectively, each branch comprising an electrical load consisting of a plurality of LEDs connected in series as seen in FIG. 4; 202 leads to $V_{ss}$, the source voltage or ground. In the circuit shown in FIG. 2, a bias current from 207*a*, 207*b* passed through the bias resistor 203*a*, 203*b*, biases the base-emitter junctions of NPN-type BJT 204*a*, 204*b*, respectively. If this bias current at a given BJT is larger than its collector current divided by its current gain β, i.e. if $I_{bias,\ A}>I_{collector,\ A}/\beta_A$ or if $I_{bias,\ B}>I_{collector,\ B}/\beta_B$ and the two loads are not exactly the same, one of the two BJTs will be saturated, forward biasing either diode 205*a* or 205*b*. This diode current will reduce the net transistor base current until it reaches the base current required for the non-saturated BJT to drive its load at the minimum possible voltage. Nominally the emitter resistors 206*a* and 206*b* are sized so that about 100-150 mV potential drop is present across each. In the case that the two loads are identical, both diodes 205*a* and 205*b* will conduct forward current and both BJTs 204*a* and 204*b* will be operating in saturation mode, leading again to minimum power consumption.

To best match currents at branch connections 201*a* and 201*b* with the method of FIG. 2, the transistors should have large current gain factors and low saturation voltage, and the diodes should have low forward voltage thresholds $V_f$. Schottky diodes work well for this purpose. Additionally a large Early voltage is required of the chosen BJT such that the collector currents remain closely matched in the event their potentials are several volts apart. A large current gain factor ensures that changes in the bias current do not substantially affect the branch current. The low saturation and low diode forward voltage work together to keep collector current from saturating even when current flows forward in one of the diodes, such that the sum of saturation voltage and forward voltage is less than the base-to-emitter voltage at currents in the range of interest of the invention. Either or both diodes 205*a*, 205*b* can also be replaced by a transistor configured as a diode, accomplished by shorting the base lead to the collector lead if using a BJT or the gate terminal to the drain terminal if using a MOSFET.

In a second embodiment of the invention, the diodes 205*a*, 205*b* can be omitted entirely, in which case one base-collector junction will act as the forward diode and place the transistor with the lowest collector voltage in saturation. This would not be possible using MOSFETs as the gate current is effectively zero. The disadvantage to this configuration is that the collector current in the branch with the saturated transistor will be reduced, resulting in degraded current matching performance. In addition, the saturated transistor will lead to lower collector voltage and reduced power at all transistors. In cases where matching requirements are not strict and omitting components is desirable due to cost or space considerations this may be acceptable.

Figure 3:
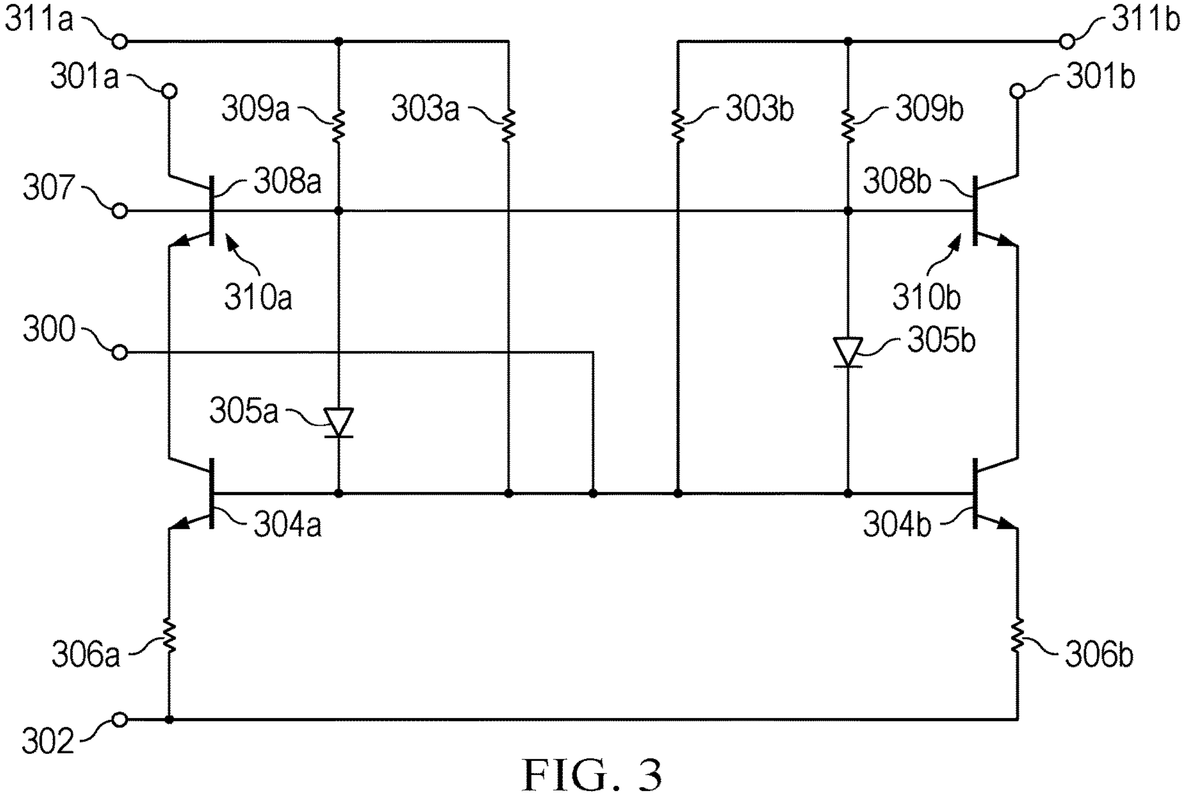
FIG. 3 is a low-power current-matching circuit using cascoded BFI's, in a third embodiment of the invention.

In a third embodiment of the invention, if better current matching performance is required, a cascoded circuit may be used in a manner similar to that of FIG. 1, but substituting BJTs for MOSFETs. Referring to FIG. 3, only one diode 305*a* or 305*b* is used to separate the cascoded transistors 304*a* and 308*a* or 304*b* and 308*b*, respectively. The base-collector diode 205*a*, 205*b* is omitted as the cascoded transistor base-emitter junction 310*a*, 310*b* serves the same function. The resistors 303*a*, 303*b* can be omitted from the method of FIG. 3 provided resistors 309*a*, 309*b* are sized to supply an appropriate base current to both cascoded transistors. Bias current enters from 311*a*, 311*b*. Diodes 305*a*, 305*b* can be selected to ensure very low collector voltage for both BJTs 304*a*, 304*b*, such that said BJTs are operating near saturation when loads are balanced at the current of interest. A diode 305*a*, 305*b* forward voltage equal to or slightly greater than the saturation voltage of its associated BJT 304*a* or 304*b* will result in good performance and relatively low power consumption.

Figure 6:
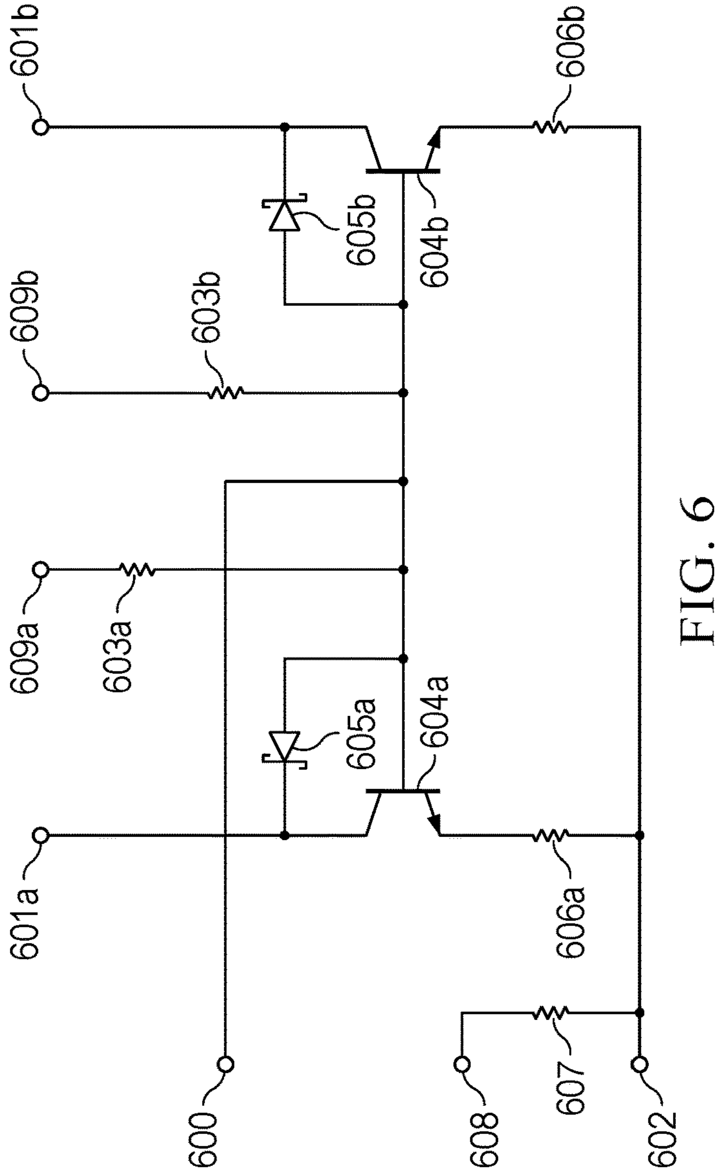
FIG. 6 provides a schematic of a pair of current splitters in the first embodiment of the invention.

FIG. 4 shows the expanded inputs and outputs to the current splitter configuration of FIG. 2 or 3, including the full branches 400*a*, 400*b*, 400*c*, 400*d*, each having a load comprising a plurality of LED elements 401, and an additional stage 402 corresponding to branches 400*e*, 400*d*. The block 403 represents a circuit comprising two current splitters in a first, second, or third embodiment of the invention. Accordingly, letting 403 represent the pair of current splitters in the first embodiment of the invention as shown in FIG. 2, 404*a* continues into 201*a*, 405*a* continues into 203*a*, 404*b* continues into 201*b*, 405*b* continues into 203*b*, 406 continues into 200, and 407 continues from 202. Output 408 corresponds to an optional error-catching signal output 608 which is shown in FIG. 6, and expanded upon in FIG. 9. These elements are mirrored in the added stage 402. Primary current is delivered to the parallel branches 400*a-d* by 409. It can be seen that branch 400*a* splits at junction 411, with one leg continuing to input 405*a* and bias resistor 203*a*, and the other leg continuing through two further LED elements 410 to input 404*a* and to the collector lead of BJT 204*a*. This configuration ensures a voltage of at two times the forward voltage of an LED is present across each said bias resistor 203*a*; in practice this is approximately 3-6V depending on LED Vf. The design may benefit from a different number of forward biased LEDs based on voltage and current requirements or limitations. In the case where BJT collector voltage needs to increase due to a load voltage imbalance, voltage across the associated bias resistor will increase by the same amount, increasing BJT base current and effectively limiting further BJT collector voltage increases. This negative feedback property of the circuit improves performance at high frequencies by limiting transients and overshoot.

Figure 5:
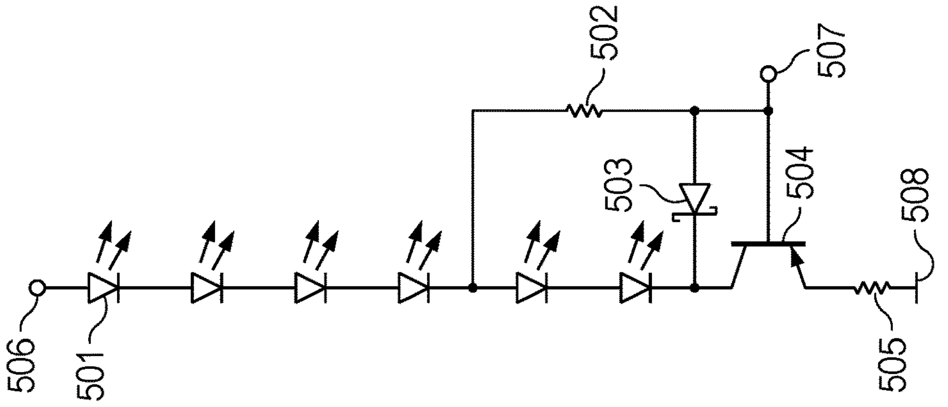
FIG. 5 isolates one branch of the circuit of FIGS. 2 and 4, in a first embodiment of the invention.

FIG. 5 isolates a single branch of the first embodiment of the invention, said first embodiment being an extendable current splitter built with a BJT and a Schottky diode between the gate and collector leads as shown in FIGS. 2 and 4. Component values of elements of FIG. 5 are as follows: each of the LEDs 501 is of type DS186; bias resistor 502 is of size 3 kΩ; diode 503 is of type RB501VM-40; BJT 504 is of type EXT1053AK; emitter resistor 505 is of size 220 mΩ. Branch A continues from 506, additional stages are added at 507, and 508 is the source voltage or ground. This current splitter is optimized for 600 mA maximum and requires only four components per leg.

Figure 11:
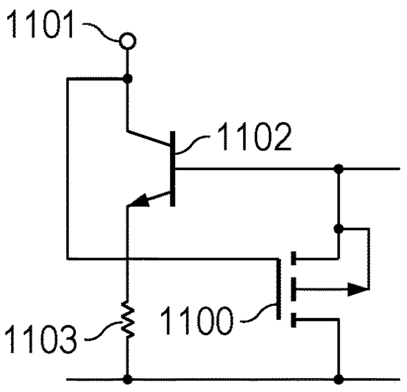
FIG. 11 is a variation of the first embodiment of FIG. 2 in which the Schottky diode is replaced by a PMOS transistor.
Figure 12:
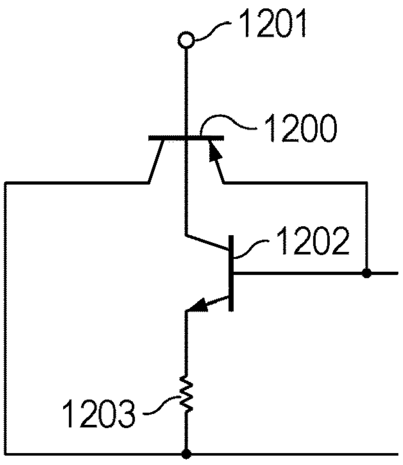
FIG. 12 is a variation of the first embodiment of FIG. 2 in which the Schottky diode is replaced by a PNP BJT.

In some instances, the Schottky diode of the first embodiment of the invention can be replaced by a transistor. Referring to FIG. 11, the Schottky diode is replaced by a PMOS transistor (a p-channel MOSFET) 1100. Also present in FIG. 11 are the LED line 1101 connecting to a load comprising a plurality of LED elements, BJT 1102, and emitter resistor 1103. Referring to FIG. 12, the Schottky diode of the first embodiment is replaced by a PNP BJT 1200. Also present in FIG. 12 are the LED line 1201 connecting to a load comprising a plurality of LED elements, BJT 1202, and emitter resistor 1203.

These two variations are possible provided the selected replacement components (PNP or PMOS) provide a substantial base to ground current at a base to collector voltage comparable to that of a Schottky (~+0.2 to +0.4V). In the case of the PNP this requires a large transistor and also implies that the maximum collector voltage will likely be limited by the PNP base-emitter voltage. For the PMOS this alternative requires a very low threshold voltage somewhat lower than the Schottky voltage. Integrated implementation of the invention may best benefit from these alternative if Schottky diodes are not available. Note that both PMOS and PNP variations seem to degrade the transient characteristics of the system compared to the Schottky, as both present short voltage transient spikes on the collector during turn-on, whereas the Schottky does not.

Criteria for Component Selection

In choosing a transistor, current gain $h_{FE}$ should be greater than 100; the Early voltage $V_{Early}$ should be as large as possible, unless low power consumption is prioritized over matching performance, in which case a low Early voltage is desirable (a lower Early voltage reduces power consumption by reducing the voltage excursion on unsaturated circuit legs, although matching performance is degraded); the saturation voltage target is $V_{sat}$=~0.3V @ $I_{Rbias}$; the desired power dissipation should be greater than the maximum current through an LED multiplied by the maximum voltage at the transistor collector lead, i.e. $P_D > I_{LED,\ max} * V_{collector,\ max}$; and the maximum current should be greater than the maximum current through an LED, $I_{max} > I_{LED,max}$.

In choosing a diode, the desired forward voltage $V_f$ is given by $V_f < 0.7V - V_{sat}$ at the maximum current through an LED and at maximum leg-voltage difference, $V_{sat}$ being the transistor criterium given by the formula above.

The bias resistor should be sized according to the formula: $R_{bias}$=2*the LED forward voltage divided by the quantity maximum LED current times BJT current gain factor at the minimum operating temperature, i.e. $R_{bias} = 2*V_{f,\ LED}/(I_{LED,\ max}*h_{FE\ min})$. Where 2 here is the number of forward biased LEDs selected for the design bias resistor.

The emitter resistor should be sized as approximately 125 mV divided by the maximum LED current.

Below are some components which meet reasonable performance requirements for a maximum branch current of about 600 mA. Of the transistors, ZXT1053AK is preferred. $h_{FE}$ is given for a collector current of about 600 mA. ZXTN25100DG has a higher $h_{FE}$ at lower currents.

| Transistor | $P_D$ | $h_{FE,\ min}$ | $V_{sat}$ | $V_{Early}$ | $I_{max}$ | Package |
|---|---|---|---|---|---|---|
| ZXTN25100DG | 3 W | 40-120 | 0.10 | 117 | 3 A | SOT223 |
| FZT855 | 3 W | 100 | 0.30 | 350 | 5 A | SOT223 |
| NSS1C301ET4G | 12 W | 120 | 0.09 | 6.3 | 3 A | TO252 |
| ZXTN619MA | 1.5 W | 84 | 0.20 | 84 | 4 A | DFN2mm |
| ZXTN620MA | 1.5 W | 84 | 0.19 | 110 | 5 A | DFN2mm |
| ZXT1053AK | 4 W | 300 | 0.16 | 150 | 5 A | TO252 |

| Diode | Vf(10 mA) | Bv |
|---|---|---|
| RB501VM | 0.25 | 40 |

What follows is a comparison of SPICE-simulated performance characteristics of the invention in three configurations and using four different transistor models. The three configurations are the first, second, and third embodiments of the invention which accomplish current splitting using singular bipolar transistors and Schottky diodes, singular bipolar transistors without Schottky diodes, and cascoded bipolar transistors, respectively.

FIG. 6 provides a schematic of a stage comprising a pair of current splitters in the first embodiment of the invention, each current splitter comprising a singular bipolar junction transistor 604*a*, 604*b* and a Schottky diode 605*a*, 605*b* between the gate and collector leads of said transistor. 601*a*, 601*b* lead from branches A and B respectively, each branch comprising a load consisting of a plurality of LED elements. The first embodiment further comprises in each current splitter a bias resistor 603*a*, 6036, and emitter resistor 606*a*, 606*b*. Additional stages are added at 600 and source voltage or ground is given by 602. See FIG. 9 and error-catching discussion below. 609*a*, 609*b* carry bias current corresponding to 405*a*, 405*b* of FIG. 4.

Figure 7:
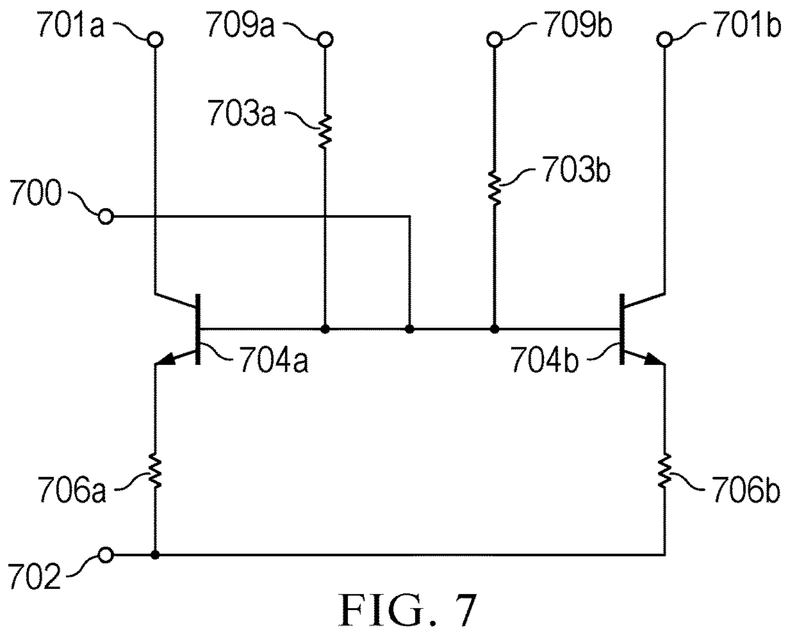
FIG. 7 provides a schematic of a pair of current splitters in the second embodiment of the invention.

FIG. 7 and the second embodiment of the invention are similar in ail respects to FIG. 6 and the first embodiment except that the Schottky diodes 605*a*, 605*b* are omitted. FIG. 7 provides a schematic of a stage comprising a pair of current splitters in the second embodiment of the invention, each current splitter comprising a singular bipolar junction transistor 704*a*, 704*b*. 701*a*, 701*b* lead from branches A and B respectively, each branch comprising a load consisting of a plurality of LED elements. The second embodiment further comprises in each current splitter a bias resistor 703*a*, 703*b*, and emitter resistor 706*a*, 706*b*. Additional stages are added at 700 and source voltage or ground is given by 702. See FIG. 9 and error-catching discussion below. 709*a*, 709*b* carry bias current corresponding to 405*a*, 405*b* of FIG. 4.

Figure 8:
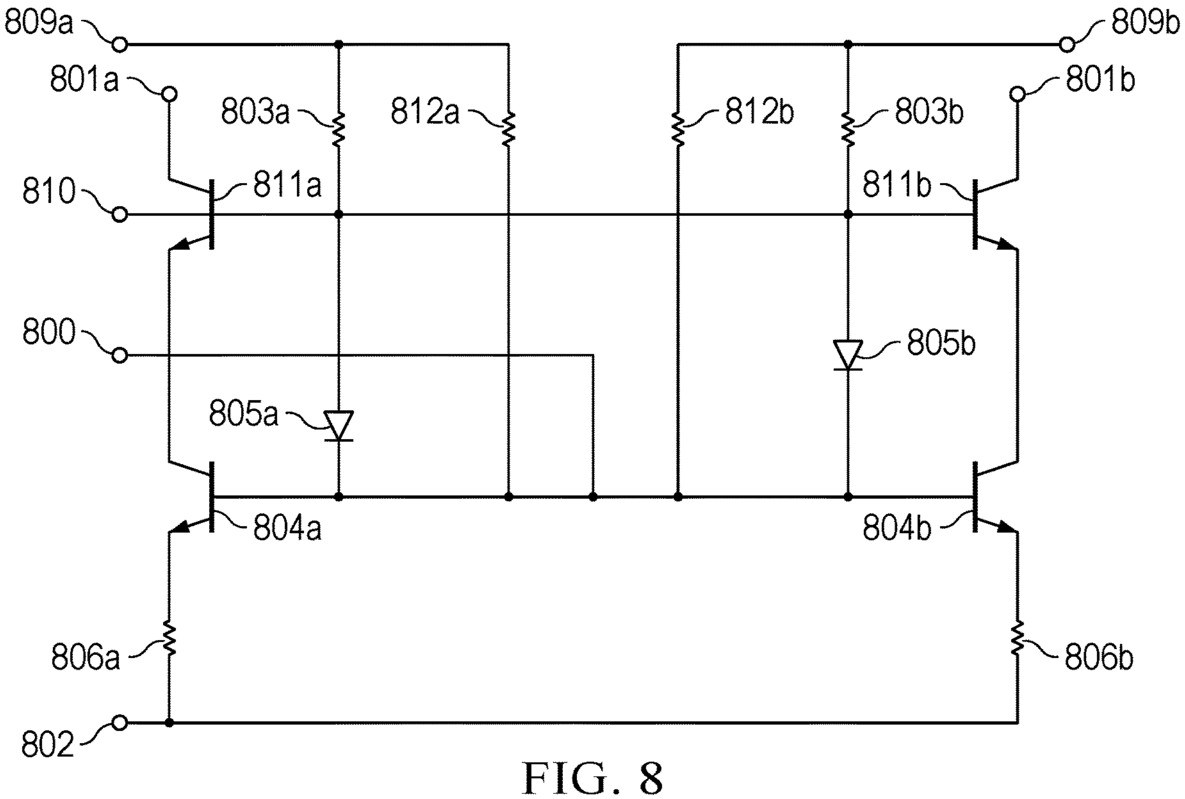
FIG. 8 provides a schematic of a pair of current splitters in the third embodiment of the invention.

FIG. 8 provides a schematic of a stage comprising a pair of current splitters in the third embodiment of the invention, each current splitter comprising two bipolar junction transistors in a cascoded configuration 804*a* with 811*a*, and 804*b* with 811*b*. 801*a*, 801*b* lead from branches A and B respectively, each branch comprising a load consisting of a plurality of LED elements. The third embodiment further comprises in each current splitter a bias resistor 803*a*, 803*b* connected to the gate leads of BJTs 811*a*, 811*b* and then through a diode 805*a*, 805*b* to the gate leads of BJTs 804*a*, 804*b*. Each current splitter additionally comprises a second bias resistor 812*a*, 812*b* and emitter resistor 806*a*, 806*b*. Additional stages are added at 800 and source voltage or ground is given by 802. See FIG. 9 and error-catching discussion below. 809*a*, 809*b* carry bias current corresponding to 405*a*, 405*b* of FIG. 4.

The following performance comparison simulation results assume a system of four branches or strings, each branch comprising a plurality of LED elements and a current splitter as presented in FIG. 4. In each simulation, one branch, $I_1$, sees a voltage offset. With some exceptions, data are separated by BJT component model, each component model being simulated in three configurations corresponding to the three embodiments of the invention: the first embodiment being labeled "Schottky", the second being labeled "No Schottky", and the third being labeled "Cascade"; each component/configuration combination simulation being run at seven $I_1$ voltage offsets ranging from −3.2V to +3.2V, each offset being simulated at two temperatures and two current gain values. Quantities measured during simulation and compiled below are power, lumen, $I_1$, $I_{2,3,4}$, and power loss, wherein, as seen in FIGS. 2 and 4:

$I_1$, is defined above;

$I_{2,3,4}$, is the current in other branches (they are all equal);

Lumen is the light output;

$P_{in}$ and $P_{max}$ are power loss when $V_{offset}$ is swept from −3.2V to +3.2V;

$I_{min}$ is the minimum current of $I_1$ and $I_{234}$;

$I_{max}$ is the maximum current of $I_1$ and $I_{234}$;

Spread is $I_{max}-I_{min}$; and

Hfe is the simulated transistor gain at either minimum gain (Low) of maximum gain (high). For each component model, a summary of results is presented followed by more detailed simulation data. Data compiled in each summary consists of configuration; temperature; current gain; $I_{min}$, the minimum single branch current obtained at the given configuration, temperature, and current gain; $I_{max}$, the maximum single branch current obtained at the given configuration, temperature, and current gain; Spread, the difference between $I_{max}$ and $I_{min}$; $P_{min}$, the power when all charges are balanced ($V_{offset}$=0.0V) wherein $V_{offset}$ is as seen in FIG. 4; $P_{max}$, the power when offset voltage is +3.2V resulting in three branches having ~$V_{sat}$+3.2V on the collector.

It should be noted that bench testing has found that higher current transistors perform better in a discrete implementation of the invention despite simulation results suggesting that medium current transistors are satisfactory. This is a result of the simulation models used, SPICE (Simulation Program with Integrated Circuit Emphasis), having often reduced transistor modeling accuracy in the operating range of interest to the invention, namely the region between linear and saturation modes. Real-world bench measurement data suggests matching currents of 1%/V is achievable with the invention wherein %/V is the percentage of mismatch in the branch currents when one branch is X Volts above/below the other branches. An ideal current splitter would have 0%/V, or perfect current mirroring at any voltage. Additionally, with a discrete implementation it was found that a temperature difference between NPN transistors was the main source of inaccuracies in results when compared to simulations. When care is taken to thermally match transistors the expected accuracy of about 1%/V/pair is achievable. This is illustrated by using the circuit disclosed in FIG. 15 and the corresponding performance seen in FIG. 16. [Insert Comeau discussion to come].

Summary of Transistor NSS1C301ET4G Results

| | Temp [C.] | $h_{FE}$ | $I_{min}$ [A] | $I_{max}$ [A] | Spread [A] | $P_{min}$ [W] | $P_{max}$ [W] |
|---|---|---|---|---|---|---|---|
| Schottky | 0 | Low | 0.566 | 0.626 | 0.060 | 1.709 | 6.942 |
| | 0 | high | 0.560 | 0.627 | 0.067 | 1.544 | 6.813 |
| | 85 | Low | 0.563 | 0.630 | 0.067 | 1.567 | 6.715 |
| | 85 | high | 0.558 | 0.630 | 0.073 | 1.460 | 6.597 |
| No Schottky | 0 | Low | 0.529 | 0.631 | 0.102 | 1.147 | 5.618 |
| | 0 | high | 0.479 | 0.652 | 0.173 | 0.547 | 5.076 |
| | 85 | Low | 0.514 | 0.640 | 0.125 | 0.758 | 5.352 |
| | 85 | high | 0.475 | 0.657 | 0.182 | 0.624 | 4.817 |
| Cascode | 0 | Low | 0.577 | 0.608 | 0.031 | 1.537 | 6.278 |
| | 0 | high | 0.546 | 0.618 | 0.072 | 0.774 | 5.892 |
| | 85 | Low | 0.572 | 0.611 | 0.039 | 1.176 | 6.270 |
| | 85 | high | 0.548 | 0.619 | 0.071 | 0.927 | 5.919 |

Detailed Transistor NSS1C301ET4G Results

| $V_{Offset}$ [V] | Power [W] | Lumen | Lum/ Watt | $I_{2,3,4}$ [A] | $I_1$ [A] | PowerLoss [W] |
|---|---|---|---|---|---|---|
| NSS1C301ET4G; Temp = 0 C.; Min $h_{FE}$; Schottky | | | | | | |
| −3.2 | 112.2 | 10252 | 91.4 | 0.591 | 0.626 | 3.51 |
| −1.6 | 112.2 | 10254 | 91.4 | 0.595 | 0.614 | 2.57 |
| −0.8 | 112.3 | 10254 | 91.3 | 0.598 | 0.607 | 2.12 |
| 0 | 112.4 | 10255 | 91.3 | 0.600 | 0.600 | 1.71 |
| 0.8 | 114.0 | 10254 | 89.9 | 0.603 | 0.590 | 2.89 |
| 1.6 | 115.8 | 10252 | 88.5 | 0.606 | 0.582 | 4.21 |
| 3.2 | 119.4 | 10249 | 85.8 | 0.611 | 0.566 | 6.94 |
| NSS1C301ET4G; Temp = 0 C.; Max $h_{FE}$; Schottky | | | | | | |
| −3.2 | 112.1 | 10252 | 91.5 | 0.591 | 0.627 | 3.41 |
| −1.6 | 112.1 | 10254 | 91.5 | 0.595 | 0.616 | 2.44 |
| −0.8 | 112.1 | 10254 | 91.5 | 0.597 | 0.610 | 1.97 |
| 0 | 112.2 | 10255 | 91.4 | 0.600 | 0.600 | 1.54 |
| 0.8 | 113.8 | 10253 | 90.1 | 0.606 | 0.582 | 2.67 |
| 1.6 | 115.6 | 10252 | 88.7 | 0.609 | 0.574 | 4.04 |
| 3.2 | 119.2 | 10248 | 85.9 | 0.613 | 0.560 | 6.81 |
| NSS1C301ET4G; Temp = 85 C.; Min $h_{FE}$; Schottky | | | | | | |
| −3.2 | 105.5 | 10262 | 97.2 | 0.591 | 0.630 | 3.38 |
| −1.6 | 105.6 | 10264 | 97.2 | 0.595 | 0.616 | 2.43 |
| −0.8 | 105.7 | 10265 | 97.2 | 0.598 | 0.609 | 1.98 |
| 0 | 105.7 | 10265 | 97.1 | 0.601 | 0.601 | 1.57 |
| 0.8 | 107.3 | 10264 | 95.6 | 0.605 | 0.588 | 2.70 |
| 1.6 | 109.1 | 10263 | 94.1 | 0.608 | 0.579 | 4.02 |
| 3.2 | 112.7 | 10259 | 91.1 | 0.613 | 0.563 | 6.71 |
| NSS1C301ET4G; Temp = 85 C.; Max $h_{FE}$; Schottky | | | | | | |
| −3.2 | 105.4 | 10262 | 97.3 | 0.591 | 0.630 | 3.30 |
| −1.6 | 105.5 | 10264 | 97.3 | 0.595 | 0.618 | 2.34 |
| −0.8 | 105.5 | 10265 | 97.3 | 0.597 | 0.611 | 1.87 |
| 0 | 105.6 | 10265 | 97.2 | 0.601 | 0.601 | 1.46 |
| 0.8 | 107.1 | 10264 | 95.8 | 0.607 | 0.581 | 2.51 |
| 1.6 | 108.9 | 10262 | 94.2 | 0.610 | 0.573 | 3.86 |
| 3.2 | 112.5 | 10258 | 91.2 | 0.615 | 0.558 | 6.60 |
| NSS1C301ET4G; Temp = 0 C.; Min $h_{FE}$; No Schottky | | | | | | |
| −3.2 | 111.2 | 10253 | 92.2 | 0.590 | 0.631 | 2.53 |
| −1.6 | 111.3 | 10254 | 92.1 | 0.595 | 0.615 | 1.62 |
| −0.8 | 111.4 | 10255 | 92.0 | 0.598 | 0.607 | 1.25 |

-continued

| $V_{Offset}$ [V] | Power [W] | Lumen | Lum/ Watt | $I_{2,3,4}$ [A] | $I_1$ [A] | PowerLoss [W] |
|---|---|---|---|---|---|---|
| 0 | 111.8 | 10255 | 91.7 | 0.600 | 0.600 | 1.15 |
| 0.8 | 113.0 | 10254 | 90.8 | 0.605 | 0.585 | 1.87 |
| 1.6 | 114.6 | 10252 | 89.4 | 0.612 | 0.565 | 3.06 |
| 3.2 | 118.0 | 10243 | 86.0 | 0.624 | 0.529 | 5.62 |
| NSS1C301ET4G; Temp = 0 C.; Max $h_{FE}$; No Schottky | | | | | | |
| −3.2 | 111.0 | 10250 | 92.4 | 0.583 | 0.652 | 2.39 |
| −1.6 | 111.0 | 10253 | 92.3 | 0.587 | 0.638 | 1.39 |
| −0.8 | 111.1 | 10254 | 92.3 | 0.590 | 0.630 | 0.91 |
| 0 | 111.2 | 10256 | 92.2 | 0.600 | 0.600 | 0.55 |
| 0.8 | 112.2 | 10246 | 91.3 | 0.625 | 0.526 | 1.08 |
| 1.6 | 113.9 | 10240 | 89.9 | 0.630 | 0.510 | 2.38 |
| 3.2 | 117.3 | 10227 | 87.2 | 0.540 | 0.479 | 5.08 |
| NSS1C301ET4G; Temp = 85 C.; Min $h_{FE}$; No Schottky | | | | | | |
| −3.2 | 104.7 | 10262 | 98.1 | 0.588 | 0.640 | 2.54 |
| −1.6 | 104.8 | 10264 | 98.0 | 0.593 | 0.623 | 1.59 |
| −0.8 | 104.8 | 10265 | 97.9 | 0.596 | 0.615 | 1.14 |
| 0 | 104.9 | 10266 | 97.8 | 0.601 | 0.601 | 0.76 |
| 0.8 | 106.3 | 10263 | 96.6 | 0.611 | 0.569 | 1.64 |
| 1.6 | 107.9 | 10260 | 95.1 | 0.618 | 0.550 | 2.84 |
| 3.2 | 111.2 | 10250 | 92.2 | 0.630 | 0.514 | 5.35 |
| NSS1C301ET4G; Temp = 85 C.; Max $h_{FE}$; No Schottky | | | | | | |
| −3.2 | 104.5 | 10259 | 98.2 | 0.582 | 0.657 | 2.43 |
| −1.6 | 104.6 | 10262 | 98.1 | 0.587 | 0.642 | 1.43 |
| −0.8 | 104.6 | 10264 | 98.1 | 0.590 | 0.633 | 0.96 |
| 0 | 104.8 | 10266 | 98.0 | 0.601 | 0.601 | 0.62 |
| 0.8 | 105.5 | 10255 | 97.2 | 0.626 | 0.524 | 0.94 |
| 1.6 | 107.2 | 10250 | 95.6 | 0.632 | 0.506 | 2.20 |
| 3.2 | 110.6 | 10236 | 92.6 | 0.643 | 0.475 | 4.82 |
| NSS1C301ET4G; Temp = 0 C.; Min $h_{FE}$; Cascode | | | | | | |
| −3.2 | 111.6 | 10243 | 91.8 | 0.597 | 0.608 | 2.88 |
| −1.6 | 111.7 | 10245 | 91.7 | 0.599 | 0.604 | 2.03 |
| −0.8 | 111.8 | 10245 | 91.6 | 0.599 | 0.602 | 1.68 |
| 0 | 112.2 | 10245 | 91.3 | 0.600 | 0.600 | 1.54 |
| 0.8 | 113.4 | 10244 | 90.3 | 0.601 | 0.596 | 2.34 |
| 1.6 | 115.2 | 10242 | 88.9 | 0.603 | 0.591 | 3.61 |
| 3.2 | 118.8 | 10238 | 86.2 | 0.608 | 0.577 | 6.28 |
| NSS1C301ET4G; Temp = 0 C.; Max $h_{FE}$; Cascode | | | | | | |
| −3.2 | 111.3 | 10243 | 92.0 | 0.594 | 0.618 | 2.63 |
| −1.6 | 111.3 | 10245 | 92.0 | 0.596 | 0.613 | 1.67 |
| −0.8 | 111.3 | 10246 | 92.0 | 0.597 | 0.610 | 1.20 |
| 0 | 111.4 | 10246 | 92.0 | 0.600 | 0.600 | 0.77 |
| 0.8 | 112.9 | 10244 | 90.7 | 0.609 | 0.572 | 1.79 |
| 1.6 | 114.7 | 10241 | 89.3 | 0.612 | 0.564 | 3.14 |
| 3.2 | 118.3 | 10234 | 86.5 | 0.618 | 0.546 | 5.89 |
| NSS1C301ET4G; Temp = 85 C.; Min $h_{FE}$; Cascode | | | | | | |
| −3.2 | 105.1 | 10254 | 97.5 | 0.597 | 0.611 | 2.94 |
| −1.6 | 105.2 | 10255 | 97.5 | 0.599 | 0.606 | 2.03 |
| −0.8 | 105.3 | 10256 | 97.4 | 0.600 | 0.604 | 1.58 |
| 0 | 105.3 | 10257 | 97.4 | 0.601 | 0.601 | 1.18 |
| 0.8 | 106.9 | 10255 | 95.9 | 0.603 | 0.592 | 2.29 |
| 1.6 | 108.7 | 10253 | 94.3 | 0.606 | 0.586 | 3.60 |
| 3.2 | 112.2 | 10248 | 91.3 | 0.610 | 0.572 | 6.27 |
| NSS1C301ET4G; Temp = 85 C.; Max $h_{FE}$; Cascode | | | | | | |
| −3.2 | 104.9 | 10254 | 97.7 | 0.595 | 0.619 | 2.76 |
| −1.6 | 105.0 | 10255 | 97.7 | 0.596 | 0.613 | 1.81 |
| −0.8 | 105.0 | 10256 | 97.7 | 0.597 | 0.611 | 1.33 |
| 0 | 105.1 | 10257 | 97.6 | 0.601 | 0.601 | 0.93 |
| 0.8 | 106.5 | 10254 | 96.3 | 0.610 | 0.573 | 1.86 |
| 1.6 | 108.3 | 10252 | 94.7 | 0.613 | 0.565 | 3.20 |
| 3.2 | 111.8 | 10245 | 91.6 | 0.618 | 0.548 | 5.92 |

Summary of Transistor ZXTN619MA Results

| | Temp [C.] | $h_{FE}$ | $I_{min}$ [A] | $I_{max}$ [A] | Spread [A] | $P_{min}$ [W] | $P_{max}$ [W] |
|---|---|---|---|---|---|---|---|
| Schottky | 0 | Low | 0.594 | 0.603 | 0.010 | 1.842 | 7.279 |
| | 0 | high | 0.589 | 0.605 | 0.015 | 1.649 | 7.186 |
| | 85 | Low | 0.563 | 0.630 | 0.067 | 1.567 | 6.715 |
| | 85 | high | 0.558 | 0.630 | 0.073 | 1.460 | 6.597 |
| No Schottky | 0 | Low | 0.529 | 0.631 | 0.102 | 1.147 | 5.618 |
| | 0 | high | 0.479 | 0.652 | 0.173 | 0.547 | 5.076 |
| | 85 | Low | 0.514 | 0.640 | 0.125 | 0.758 | 5.352 |
| | 85 | high | 0.475 | 0.657 | 0.182 | 0.624 | 4.817 |
| Cascode | 0 | Low | 0.577 | 0.608 | 0.031 | 1.537 | 6.278 |
| | 0 | high | 0.546 | 0.618 | 0.072 | 0.774 | 5.892 |
| | 85 | Low | 0.572 | 0.611 | 0.039 | 1.176 | 6.270 |
| | 85 | high | 0.548 | 0.619 | 0.071 | 0.927 | 5.919 |

Detailed Transistor ZXTN619MA Results

| $V_{Offset}$ [V] | Power [W] | Lumen | Lum/ Watt | $I_{2,3,4}$ [A] | $I_1$ [A] | PowerLoss [W] |
|---|---|---|---|---|---|---|
| ZXTN619MA; Temp = 0 C.; Min $h_{FE}$; Schottky | | | | | | |
| −3.2 | 112.3 | 10259 | 91.3 | 0.599 | 0.603 | 3.63 |
| −1.6 | 112.4 | 10259 | 91.3 | 0.599 | 0.602 | 2.70 |
| −0.8 | 112.4 | 10259 | 91.3 | 0.600 | 0.601 | 2.25 |
| 0 | 112.5 | 10260 | 91.2 | 0.600 | 0.600 | 1.84 |
| 0.8 | 114.2 | 10259 | 89.8 | 0.601 | 0.598 | 3.08 |
| 1.6 | 116.1 | 10259 | 88.4 | 0.601 | 0.597 | 4.47 |
| 3.2 | 119.8 | 10257 | 85.6 | 0.602 | 0.594 | 7.28 |
| ZXTN619MA; Temp = 0 C.; Max $h_{FE}$; Schottky | | | | | | |
| −3.2 | 112.2 | 10259 | 91.4 | 0.598 | 0.605 | 3.53 |
| −1.6 | 112.3 | 10259 | 91.4 | 0.599 | 0.603 | 2.58 |
| −0.8 | 112.3 | 10259 | 91.4 | 0.599 | 0.602 | 2.10 |
| 0 | 112.3 | 10260 | 91.4 | 0.600 | 0.600 | 1.65 |
| 0.8 | 114.0 | 10259 | 90.0 | 0.602 | 0.594 | 2.92 |
| 1.6 | 115.9 | 10259 | 88.5 | 0.603 | 0.592 | 4.34 |
| 3.2 | 119.7 | 10257 | 85.7 | 0.604 | 0.589 | 7.19 |
| ZXTN619MA; Temp = 85 C.; Min $h_{FE}$; Schottky | | | | | | |
| −3.2 | 105.5 | 10262 | 97.2 | 0.591 | 0.630 | 3.38 |
| −1.6 | 105.6 | 10264 | 97.2 | 0.595 | 0.616 | 2.43 |
| −0.8 | 105.7 | 10265 | 97.2 | 0.598 | 0.609 | 1.98 |
| 0 | 105.7 | 10265 | 97.1 | 0.601 | 0.601 | 1.57 |
| 0.8 | 107.3 | 10264 | 95.6 | 0.605 | 0.588 | 2.70 |
| 1.6 | 109.1 | 10263 | 94.1 | 0.608 | 0.579 | 4.02 |
| 3.2 | 112.7 | 10259 | 91.1 | 0.613 | 0.563 | 6.71 |
| ZXTN619MA; Temp = 85 C.; Max $h_{FE}$; Schottky | | | | | | |
| −3.2 | 105.4 | 10262 | 97.3 | 0.591 | 0.630 | 3.30 |
| −1.6 | 105.5 | 10264 | 97.3 | 0.595 | 0.618 | 2.34 |
| −0.8 | 105.5 | 10265 | 97.3 | 0.597 | 0.611 | 1.87 |
| 0 | 105.6 | 10265 | 97.2 | 0.601 | 0.601 | 1.46 |
| 0.8 | 107.1 | 10264 | 95.8 | 0.607 | 0.581 | 2.51 |
| 1.6 | 108.9 | 10262 | 94.2 | 0.610 | 0.573 | 3.86 |
| 3.2 | 112.5 | 10258 | 91.2 | 0.615 | 0.558 | 6.60 |
| ZXTN619MA; Temp = 0 C.; Min $h_{FE}$; No Schottky | | | | | | |
| −3.2 | 111.2 | 10253 | 92.2 | 0.590 | 0.631 | 2.53 |
| −1.6 | 111.3 | 10254 | 92.1 | 0.595 | 0.615 | 1.62 |
| −0.8 | 111.4 | 10255 | 92.0 | 0.598 | 0.607 | 1.25 |
| 0 | 111.8 | 10255 | 91.7 | 0.600 | 0.600 | 1.15 |
| 0.8 | 113.0 | 10254 | 90.8 | 0.605 | 0.585 | 1.87 |
| 1.6 | 114.6 | 10252 | 89.4 | 0.612 | 0.565 | 3.06 |
| 3.2 | 118.0 | 10243 | 86.8 | 0.624 | 0.529 | 5.62 |
| ZXTN619MA; Temp = 0 C.; Max $h_{FE}$; No Schottky | | | | | | |
| −3.2 | 111.0 | 10250 | 92.4 | 0.583 | 0.652 | 2.39 |
| −1.6 | 111.0 | 10253 | 92.3 | 0.587 | 0.638 | 1.39 |
| −0.8 | 111.1 | 10254 | 92.3 | 0.590 | 0.630 | 0.91 |
| 0 | 111.2 | 10256 | 92.2 | 0.600 | 0.600 | 0.55 |
| 0.8 | 112.2 | 10246 | 91.3 | 0.625 | 0.526 | 1.08 |
| 1.6 | 113.9 | 10240 | 89.9 | 0.630 | 0.510 | 2.38 |
| 3.2 | 117.3 | 10227 | 87.2 | 0.640 | 0.479 | 5.08 |
| ZXTN619MA; Temp = 85 C.; Min $h_{FE}$; No Schottky | | | | | | |
| −3.2 | 104.7 | 10262 | 98.1 | 0.588 | 0.640 | 2.54 |
| −1.6 | 104.8 | 10264 | 98.0 | 0.593 | 0.623 | 1.59 |

-continued

| $V_{Offset}$ [V] | Power [W] | Lumen | Lum/ Watt | $I_{2,3,4}$ [A] | $I_1$ [A] | PowerLoss [W] |
|---|---|---|---|---|---|---|
| −0.8 | 104.8 | 10265 | 97.9 | 0.596 | 0.615 | 1.14 |
| 0 | 104.9 | 10266 | 97.8 | 0.601 | 0.601 | 0.76 |
| 0.8 | 106.3 | 10263 | 96.6 | 0.611 | 0.569 | 1.64 |
| 1.6 | 107.9 | 10260 | 95.1 | 0.618 | 0.550 | 2.84 |
| 3.2 | 111.2 | 10250 | 92.2 | 0.630 | 0.514 | 5.35 |
| ZXTN619MA; Temp = 85 C.; Max $h_{FE}$; No Schottky | | | | | | |
| −3.2 | 104.5 | 10259 | 98.2 | 0.582 | 0.657 | 2.43 |
| −1.6 | 104.6 | 10262 | 98.1 | 0.587 | 0.642 | 1.43 |
| −0.8 | 104.6 | 10264 | 98.1 | 0.590 | 0.633 | 0.96 |
| 0 | 104.8 | 10266 | 98.0 | 0.601 | 0.601 | 0.62 |
| 0.8 | 105.5 | 10255 | 97.2 | 0.626 | 0.524 | 0.94 |
| 1.6 | 107.2 | 10250 | 95.6 | 0.632 | 0.506 | 2.20 |
| 3.2 | 110.6 | 10236 | 92.6 | 0.643 | 0.475 | 4.82 |
| ZXTN619MA; Temp = 0 C.; Min $h_{FE}$; Cascode | | | | | | |
| −3.2 | 111.6 | 10243 | 91.8 | 0.597 | 0.608 | 2.88 |
| −1.6 | 111.7 | 10245 | 91.7 | 0.599 | 0.604 | 2.03 |
| −0.8 | 111.8 | 10245 | 91.6 | 0.599 | 0.602 | 1.68 |
| 0 | 112.2 | 10245 | 91.3 | 0.600 | 0.600 | 1.54 |
| 0.8 | 113.4 | 10244 | 90.3 | 0.601 | 0.596 | 2.34 |
| 1.6 | 115.2 | 10242 | 88.9 | 0.603 | 0.591 | 3.61 |
| 3.2 | 118.8 | 10238 | 86.2 | 0.608 | 0.577 | 6.28 |
| ZXTN619MA; Temp = 0 C.; Max $h_{FE}$; Cascode | | | | | | |
| −3.2 | 111.3 | 10243 | 92.0 | 0.594 | 0.618 | 2.63 |
| −1.6 | 111.3 | 10245 | 92.0 | 0.596 | 0.613 | 1.67 |
| −0.8 | 111.3 | 10246 | 92.0 | 0.597 | 0.610 | 1.20 |
| 0 | 111.4 | 10246 | 92.0 | 0.600 | 0.600 | 0.77 |
| 0.8 | 112.9 | 10244 | 90.7 | 0.609 | 0.572 | 1.79 |
| 1.6 | 114.7 | 10241 | 89.3 | 0.612 | 0.564 | 3.14 |
| 3.2 | 118.3 | 10234 | 86.5 | 0.618 | 0.546 | 5.89 |
| ZXTN619MA; Temp = 85 C.; Min $h_{FE}$; Cascode | | | | | | |
| −3.2 | 105.1 | 10254 | 97.5 | 0.597 | 0.611 | 2.94 |
| −1.6 | 105.2 | 10255 | 97.5 | 0.599 | 0.606 | 2.03 |
| −0.8 | 105.3 | 10256 | 97.4 | 0.600 | 0.604 | 1.58 |
| 0 | 105.3 | 10257 | 97.4 | 0.601 | 0.601 | 1.18 |
| 0.8 | 106.9 | 10255 | 95.9 | 0.603 | 0.592 | 2.29 |
| 1.6 | 108.7 | 10253 | 94.3 | 0.606 | 0.586 | 3.60 |
| 3.2 | 112.2 | 10248 | 91.3 | 0.610 | 0.572 | 6.27 |
| ZXTN619MA; Temp = 85 C.; Max $h_{FE}$; Cascode | | | | | | |
| −3.2 | 104.9 | 10254 | 97.7 | 0.595 | 0.619 | 2.76 |
| −1.6 | 105.0 | 10255 | 97.7 | 0.596 | 0.613 | 1.81 |
| −0.8 | 105.0 | 10256 | 97.7 | 0.597 | 0.611 | 1.33 |
| 0 | 105.1 | 10257 | 97.6 | 0.601 | 0.601 | 0.93 |
| 0.8 | 106.5 | 10254 | 96.3 | 0.610 | 0.573 | 1.86 |
| 1.6 | 108.3 | 10252 | 94.7 | 0.613 | 0.565 | 3.20 |
| 3.2 | 111.8 | 10245 | 91.6 | 0.618 | 0.548 | 5.92 |

Summary of Transistor ZXT1053AK Results

| | Temp [C.] | $h_{FE}$ | $I_{min}$ [A] | $I_{max}$ [A] | Spread [A] | $P_{min}$ [W] | $P_{max}$ [W] |
|---|---|---|---|---|---|---|---|
| Schottky | 0 | Low | 0.596 | 0.603 | 0.007 | 5.156 | 7.306 |
| | 0 | high | 0.590 | 0.605 | 0.015 | 1.551 | 7.108 |
| | 50 | nominal | 0.592 | 0.604 | 0.012 | 1.577 | 7.097 |
| | 85 | Low | 0.594 | 0.605 | 0.011 | 1.729 | 7.116 |
| | 85 | high | 0.591 | 0.606 | 0.015 | 1.490 | 6.996 |
| No | 0 | Low | 0.575 | 0.605 | 0.030 | 1.209 | 6.047 |
| Schottky | 0 | high | 0.535 | 0.621 | 0.086 | 0.524 | 5.652 |
| | 50 | nominal | 0.555 | 0.612 | 0.057 | 0.631 | 5.804 |
| | 85 | Low | 0.573 | 0.606 | 0.033 | 1.501 | 6.005 |
| | 85 | high | 0.525 | 0.625 | 0.100 | 0.566 | 5.418 |

For transistor ZXT1053AK, simulations were run for the first and second embodiment configurations only and include an additional data point at an intermediate temperature of 50 C and an intermediate nominal $h_{FE}$. The ZXT1053AK was not simulated in a cascoded configuration because it is a large TO252 package which presents physical implementation challenges. The outlier result $P_{min}$ of 5.156 W was due to a slightly high $R_{bias}$ value simulated in the worst-case performance conditions of 0 C and minimum $h_{FE}$ leading to insufficient current gain to ensure saturation of one transistor. This can be resolved by reducing the $R_{bias}$ used from the simulation value of 3 kΩ. Calculations suggest a more optimal $R_{bias}$ value of 2.8 kΩ.

Detailed Transistor ZXT1053AK Results

| $V_{Offset}$ [V] | Power [W] | Lumen | Lum/ Watt | $I_{2,3,4}$ [A] | $I_1$ [A] | PowerLoss [W] |
|---|---|---|---|---|---|---|
| ZXT1053AK; Temp = 0 C.; Min $h_{FE}$; Schottky | | | | | | |
| −3.2 | 113.9 | 10261 | 90.1 | 0.599 | 0.603 | 5.17 |
| −1.6 | 114.8 | 10261 | 89.4 | 0.599 | 0.602 | 5.16 |
| −0.8 | 115.3 | 10261 | 89.0 | 0.600 | 0.601 | 5.16 |
| 0 | 115.8 | 10261 | 88.6 | 0.600 | 0.600 | 5.16 |
| 0.8 | 116.3 | 10261 | 88.2 | 0.600 | 0.599 | 5.16 |
| 1.6 | 116.8 | 10261 | 87.9 | 0.601 | 0.598 | 5.16 |
| 3.2 | 119.9 | 10261 | 85.6 | 0.601 | 0.596 | 7.31 |
| ZXT1053AK; Temp = 0 C.; Max $h_{FE}$; Schottky | | | | | | |
| −3.2 | 112.1 | 10261 | 91.5 | 0.598 | 0.605 | 3.44 |
| −1.6 | 112.2 | 10261 | 91.5 | 0.599 | 0.603 | 2.48 |
| −0.8 | 112.2 | 10261 | 91.5 | 0.599 | 0.602 | 2.00 |
| 0 | 112.2 | 10261 | 91.5 | 0.600 | 0.600 | 1.55 |
| 0.8 | 114.0 | 10261 | 90.0 | 0.602 | 0.595 | 2.83 |
| 1.6 | 115.8 | 10260 | 88.6 | 0.602 | 0.593 | 4.25 |
| 3.2 | 119.6 | 10260 | 85.8 | 0.603 | 0.590 | 7.11 |
| ZXT1053AK; Temp = 85 C.; Min $h_{FE}$; Schottky | | | | | | |
| −3.2 | 105.7 | 10271 | 97.1 | 0.599 | 0.605 | 3.50 |
| −1.6 | 105.8 | 10271 | 97.1 | 0.600 | 0.603 | 2.58 |
| −0.8 | 105.8 | 10271 | 97.1 | 0.600 | 0.602 | 2.13 |
| 0 | 105.9 | 10271 | 97.0 | 0.601 | 0.601 | 1.73 |
| 0.8 | 107.6 | 10271 | 95.5 | 0.601 | 0.599 | 2.94 |
| 1.6 | 109.4 | 10271 | 93.9 | 0.602 | 0.597 | 4.31 |
| 3.2 | 113.2 | 10270 | 90.7 | 0.603 | 0.594 | 7.12 |
| ZXT1053AK; Temp = 85 C.; Max $h_{FE}$; Schottky | | | | | | |
| −3.2 | 105.6 | 10271 | 97.3 | 0.599 | 0.606 | 3.37 |
| −1.6 | 105.6 | 10271 | 97.3 | 0.600 | 0.604 | 2.41 |
| −0.8 | 105.6 | 10271 | 97.2 | 0.600 | 0.603 | 1.93 |
| 0 | 105.7 | 10271 | 97.2 | 0.601 | 0.601 | 1.49 |
| 0.8 | 107.4 | 10271 | 95.7 | 0.603 | 0.595 | 2.73 |
| 1.6 | 109.3 | 10271 | 94.0 | 0.603 | 0.594 | 4.15 |
| 3.2 | 113.0 | 10270 | 90.9 | 0.604 | 0.591 | 7.00 |
| ZXT1053AK; Temp = 0 C.; Min $h_{FE}$; No Schottky | | | | | | |
| −3.2 | 111.3 | 10261 | 92.2 | 0.598 | 0.605 | 2.55 |
| −1.6 | 111.4 | 10261 | 92.1 | 0.599 | 0.602 | 1.67 |
| −0.8 | 111.5 | 10261 | 92.0 | 0.600 | 0.601 | 1.32 |
| 0 | 111.9 | 10261 | 91.7 | 0.600 | 0.600 | 1.21 |
| 0.8 | 113.1 | 10261 | 90.7 | 0.601 | 0.596 | 2.00 |
| 1.6 | 114.9 | 10261 | 89.3 | 0.604 | 0.589 | 3.31 |
| 3.2 | 118.5 | 10259 | 86.5 | 0.608 | 0.575 | 6.05 |
| ZXT1053AK; Temp = 0 C.; Max $h_{FE}$; No Schottky | | | | | | |
| −3.2 | 111.1 | 10260 | 92.4 | 0.593 | 0.621 | 2.41 |
| −1.6 | 111.1 | 10261 | 92.4 | 0.594 | 0.618 | 1.42 |
| −0.8 | 111.1 | 10261 | 92.4 | 0.595 | 0.616 | 0.94 |
| 0 | 111.2 | 10261 | 92.3 | 0.600 | 0.600 | 0.52 |
| 0.8 | 112.5 | 10258 | 91.2 | 0.616 | 0.553 | 1.39 |
| 1.6 | 114.3 | 10256 | 89.7 | 0.618 | 0.547 | 2.80 |
| 3.2 | 118.0 | 10253 | 86.9 | 0.622 | 0.535 | 5.65 |
| ZXT1053AK; Temp = 85 C.; Min $h_{FE}$; No Schottky | | | | | | |
| −3.2 | 104.9 | 10271 | 97.9 | 0.599 | 0.606 | 2.64 |
| −1.6 | 105.0 | 10271 | 97.8 | 0.600 | 0.603 | 1.82 |
| −0.8 | 105.2 | 10271 | 97.6 | 0.600 | 0.602 | 1.55 |
| 0 | 105.7 | 10271 | 97.2 | 0.601 | 0.601 | 1.50 |
| 0.8 | 106.7 | 10271 | 96.2 | 0.602 | 0.597 | 2.09 |
| 1.6 | 108.4 | 10271 | 94.7 | 0.604 | 0.589 | 3.34 |
| 3.2 | 112.0 | 10269 | 91.7 | 0.610 | 0.573 | 6.01 |
| ZXT1053AK; Temp = 85 C.; Max $h_{FE}$; No Schottky | | | | | | |
| −3.2 | 104.6 | 10270 | 98.2 | 0.593 | 0.625 | 2.42 |
| −1.6 | 104.6 | 10271 | 98.2 | 0.594 | 0.621 | 1.44 |

-continued

| $V_{Offset}$ [V] | Power [W] | Lumen | Lum/Watt | $I_{2,3,4}$ [A] | $I_1$ [A] | PowerLoss [W] |
|---|---|---|---|---|---|---|
| −0.8 | 104.6 | 10271 | 98.2 | 0.595 | 0.619 | 0.95 |
| 0 | 104.7 | 10272 | 98.1 | 0.601 | 0.601 | 0.57 |
| 0.8 | 105.8 | 10266 | 97.0 | 0.619 | 0.547 | 1.22 |
| 1.6 | 107.7 | 10265 | 95.4 | 0.621 | 0.539 | 2.61 |
| 3.2 | 111.3 | 10261 | 92.2 | 0.626 | 0.525 | 5.42 |

Summary of Transistor ZXTN620MA Results

| | Temp [C.] | $h_{FE}$ | $I_{min}$ [A] | $I_{max}$ [A] | Spread [A] | $P_{min}$ [W] | $P_{max}$ [W] |
|---|---|---|---|---|---|---|---|
| Cascode | 0 | Low | 0.593 | 0.603 | 0.010 | 1.987 | 6.642 |
| | 0 | high | 0.583 | 0.605 | 0.023 | 0.983 | 6.447 |
| | 85 | Low | 0.594 | 0.603 | 0.009 | 2.565 | 6.741 |
| | 85 | high | 0.583 | 0.606 | 0.023 | 1.093 | 6.474 |

For transistor ZXTN620MA, simulations were run for the third embodiment configuration only, as it is a small DFN2 mm package with similar performance to the ZXT1053AK.

Detailed Transistor ZXTN620MA Results

| $V_{Offset}$ [V] | Power [W] | Lumen | Lum/Watt | $I_{2,3,4}$ [A] | $I_1$ [A] | PowerLoss [W] |
|---|---|---|---|---|---|---|
| ZXTN620MA; Temp = 0 C.; Min $h_{FE}$; Cascode | | | | | | |
| −3.2 | 111.8 | 10254 | 91.7 | 0.599 | 0.603 | 3.09 |
| −1.6 | 112.0 | 10254 | 91.6 | 0.600 | 0.601 | 2.27 |
| −0.8 | 112.2 | 10255 | 91.4 | 0.600 | 0.601 | 2.01 |
| 0 | 112.6 | 10255 | 91.0 | 0.600 | 0.600 | 1.99 |
| 0.8 | 113.7 | 10254 | 90.2 | 0.600 | 0.599 | 2.60 |
| 1.6 | 115.5 | 10253 | 88.8 | 0.601 | 0.597 | 3.89 |
| 3.2 | 119.2 | 10251 | 86.0 | 0.602 | 0.593 | 6.64 |
| ZXTN620MA; Temp = 0 C.; Max $h_{FE}$; Cascode | | | | | | |
| −3.2 | 111.6 | 10254 | 91.9 | 0.598 | 0.605 | 2.85 |
| −1.6 | 111.6 | 10255 | 91.9 | 0.599 | 0.604 | 1.90 |
| −0.8 | 111.6 | 10255 | 91.9 | 0.599 | 0.603 | 1.43 |
| 0 | 111.6 | 10255 | 91.9 | 0.600 | 0.600 | 0.98 |
| 0.8 | 113.3 | 10254 | 90.5 | 0.603 | 0.591 | 2.22 |
| 1.6 | 115.2 | 10253 | 89.0 | 0.604 | 0.589 | 3.63 |
| 3.2 | 119.0 | 10251 | 86.2 | 0.606 | 0.583 | 6.45 |
| ZXTN620MA; Temp = 85 C.; Min $h_{FE}$; Cascode | | | | | | |
| −3.2 | 105.5 | 10264 | 97.3 | 0.600 | 0.603 | 3.30 |
| −1.6 | 105.8 | 10265 | 97.0 | 0.600 | 0.602 | 2.62 |
| −0.8 | 106.2 | 10265 | 96.6 | 0.601 | 0.601 | 2.57 |
| 0 | 106.7 | 10265 | 96.2 | 0.601 | 0.601 | 2.56 |
| 0.8 | 107.5 | 10264 | 95.5 | 0.601 | 0.600 | 2.84 |
| 1.6 | 109.2 | 10264 | 94.0 | 0.602 | 0.598 | 4.05 |
| 3.2 | 112.8 | 10261 | 91.0 | 0.603 | 0.594 | 6.74 |
| ZXTN620MA; Temp = 85 C.; Max $h_{FE}$; Cascode | | | | | | |
| −3.2 | 105.2 | 10264 | 97.6 | 0.599 | 0.606 | 2.95 |
| −1.6 | 105.2 | 10265 | 97.6 | 0.599 | 0.604 | 2.00 |
| −0.8 | 105.2 | 10265 | 97.6 | 0.600 | 0.603 | 1.53 |
| 0 | 105.3 | 10266 | 97.5 | 0.601 | 0.601 | 1.10 |
| 0.8 | 106.9 | 10265 | 96.0 | 0.604 | 0.592 | 2.29 |
| 1.6 | 108.8 | 10264 | 94.4 | 0.605 | 0.589 | 3.68 |
| 3.2 | 112.5 | 10261 | 91.2 | 0.607 | 0.583 | 6.47 |

In general, the first embodiment, the "Schottky" configuration, offers much better current matching (+/−1.5% worse case) while the second embodiment, the "No Schottky" configuration, offers the lowest power consumption at about 1 W less than the first embodiment. The user will be able to select which of the two parameters (current matching or power) are most relevant for their application.

Optional Error Detection

Figure 9:
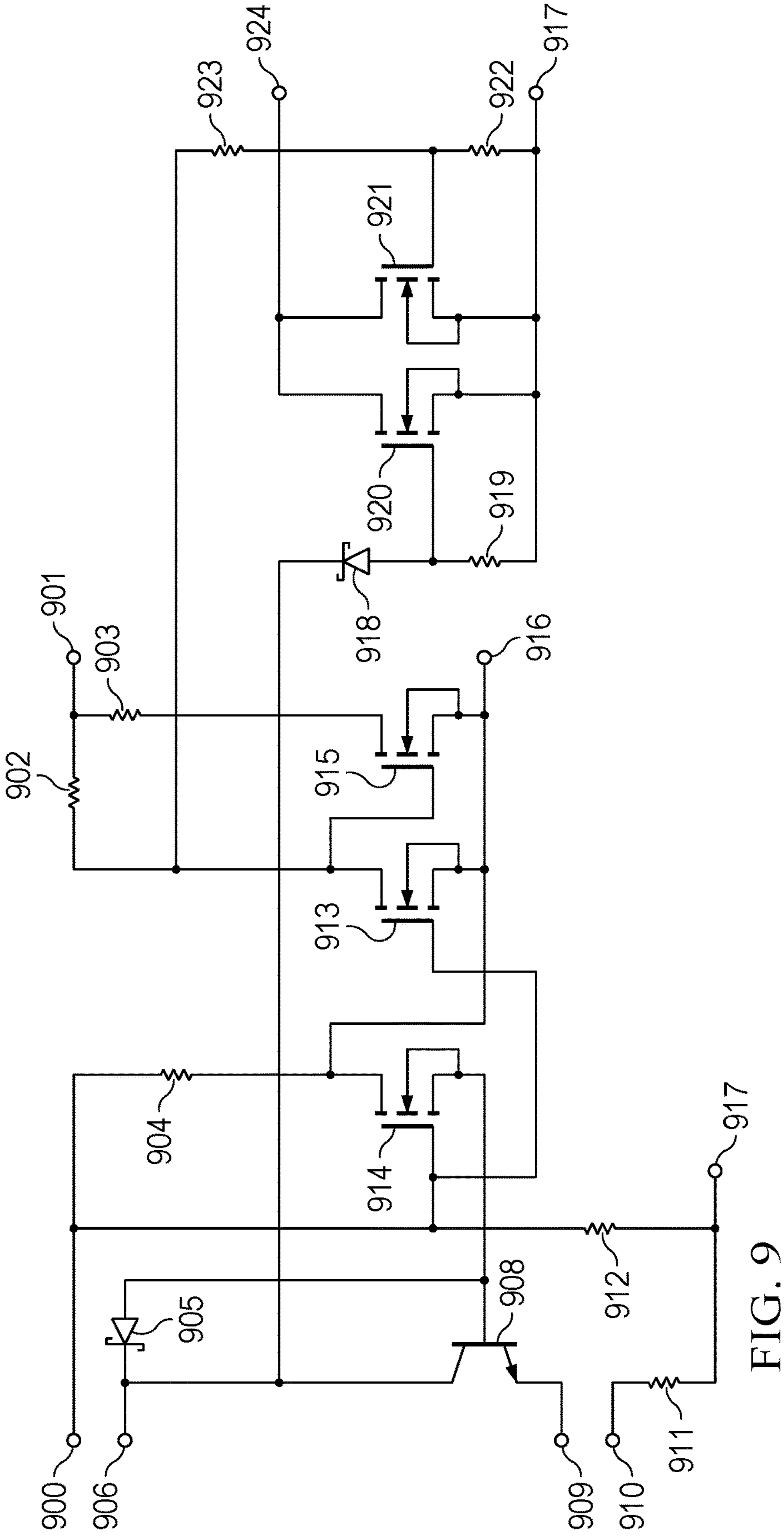
FIG. 9 provides a schematic of one branch of an error-detecting current splitter in a fourth embodiment of the invention.

FIG. 9 is a schematic of one branch of an error-detecting current splitter in a fourth embodiment of the invention. An error refers to any element failure which would cause an open circuit on an LED load line or an excessive voltage on NPN 908 collector. Referring to FIG. 9, in case of an open circuit on LED line 900, leading from a load comprising a plurality of LED elements, the error detection circuit disables BJT 908 via MOSFET, 914, preventing transistor 908 from conducting.

In turning MOSFET 914 off, the circuit also turns on MOSFET, 915, allowing resistor $R_{biasError}$ 903 ($R_{biasError}$ having the same value as $R_{bias}$, 904) to feed base current to the remaining active BJT. FIG. 9 discloses one (1) branch of a circuit containing N-branches. The other referenced BJT refer to the BJT of the other remaining branches assuming the branch in FIG. 9 is the one where the error occurred. The other branches are connected via 917, 916 and 901 This ensures enough base current to allow the total current to be divided by the remaining N−1 stages This is particularly useful for lighting application since this means almost no change in light output (although the LEDs will be operating at N/(N−1)*ExpectedCurrent which may be outside their maximum current rating).

Since an open circuit error on LED line 900 turns off 913, observe that resistor 902 (of size ~10 kΩ) is connected to the LED line 901 of the following stage which is presumably biased (assuming only one error per branch). Note that branch or string are used interchangeably in this document. This requires the Nth error detection circuit to be connected to the Nth+1 stage, the last stage then being connected to the first stage, such that the error detection circuits are connected in a circle.

An error can also be triggered if enough voltage (typically greater than approximately 6V) is built on LED line 906 via Zener diode 918, resistor $R_{biasZ}$, 919, of size ~20 kΩ, and the threshold voltage of MOSFET, 920; i.e., when $V_{906}$>~$V_{th, 920}$+$V_{z, 918}$. Other voltage values may be set with different Zeners or by using a resistive divider.

Errors can activate an ErrorOut line 924 (active low) or a red LED on the lamp itself. The active low line can also be paralleled allowing for several lamps in the same group to inform a master controller of an error condition.

This circuit is replicated for each string as required. It is likely better suited for an integrated circuit (IC) solution as the space may be limited in the lamp housing. For a discrete solution this application would cost about $0.30-$0.40 per string.

To ensure current-splitter performance is not significantly impacted, 914 and 915 should have voltage drops of preferably less than a few mV. This typically implies $R_{dsOn}$<1Ω, $R_{dsOn}$ being the MOSFET drain-source on resistance.

Additional elements of FIG. 9 include Schottky diode 905, ExtCurSenseR 909, IntCurSenseR 910, source voltage line or ground $V_{SS}$ 917, resistor 911, resistor $R_{bias, LED\ line\ 900}$ 912, additional stages are added at 916, two error bias resistors 922, 923, and MOSFET 921. ExtCurSenseR refers to a hypothetical external emitter resistor for the case of an integrate (IC) implementation and IntCurSenseR refers to a hypothetical internal resistor for the case of an integrate (IC) implementation.

The error detection circuit allows for use in high reliability applications. In such cases for example, reliability could be further improved by arranging the LEDs connected to LED line 906 and LED line 900 each into 2 groups of 2 LEDs in parallel, connected in series. The rest of the string as seen in FIG. 4 can be made of single LEDs or paralleled pairs, paralleled pairs further improving the mean time to failure. LEDs operating at current levels below their max current ratings exhibit increased lifetimes. Two in parallel would last ~30% longer than one running at 50% $I_{max}$. Combining such redundant LED arrangements with the error-detection circuit of the fourth embodiment greatly improves reliability of the total light-emitting system.

Figure 10:
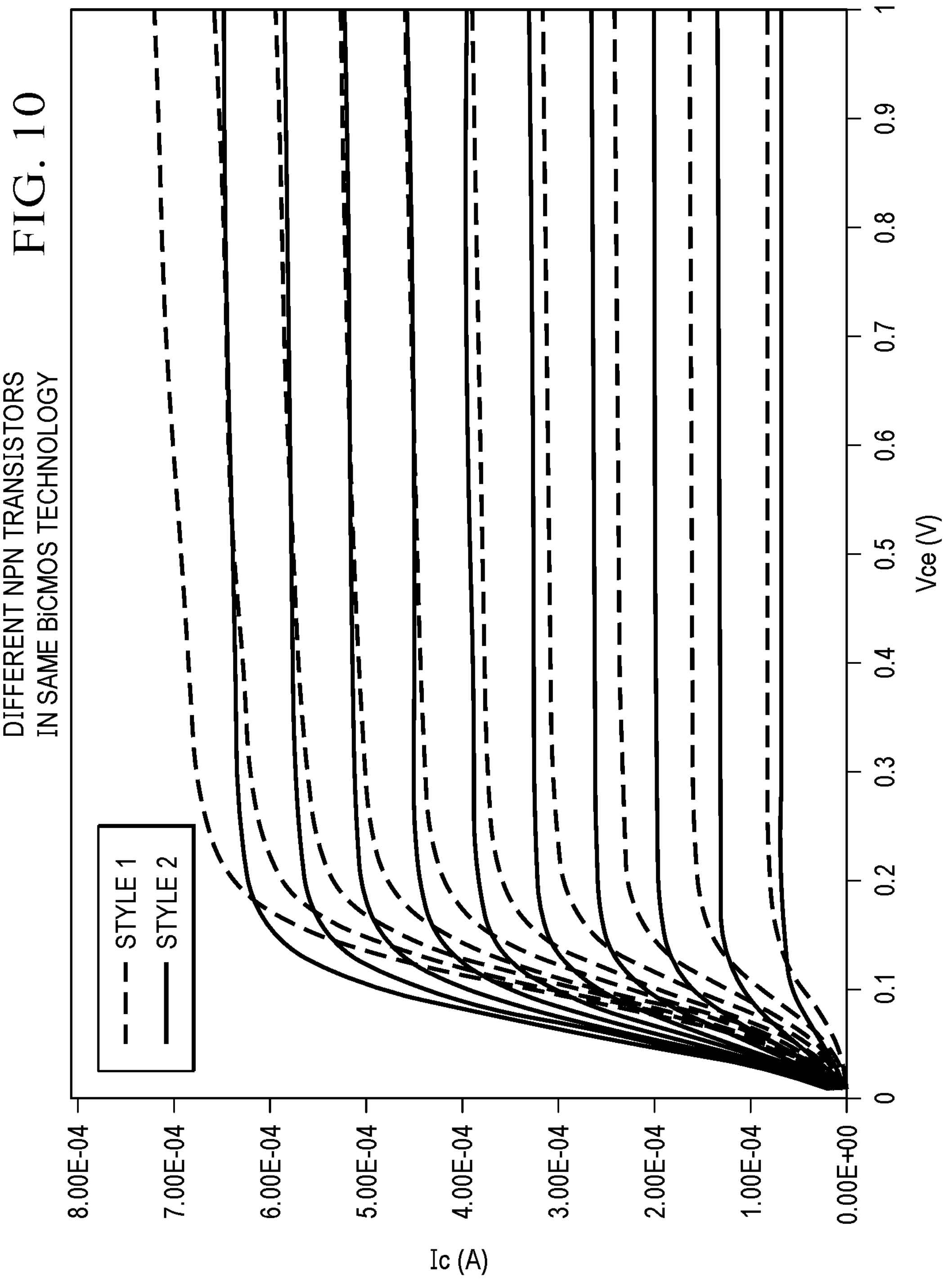
FIG. 10 is a graph of showing collector currents versus collector voltage at identically stepped base-currents for two (2) NPN transistors of different layout styles using BiCMOS technology

Referring to FIG. 10, graph 1000 shows collector currents versus collector voltage at identically stepped base-currents for two (2) NPN transistors of different layout styles using BiCMOS technology. As can be seen, e that transistor of shown as style2 is better suited for the application herein as it shows a lower saturation voltage and higher $V_{Early}$ while having comparable gain. Style_2 appears to be usable down to a collector voltage of about 0.3V up at 1.0 A.

SPICE Models Used

SPICE (Simulation Program with Integrated Circuit Emphasis) was used to simulate the various embodiments of the invention and obtain results listed above. Computer code used to generate the relevant models is provided below.

```
.subckt NSS1C301ET4G c b e NGNgain=0
*Use BF={287/1.73}              for minimum HFE
*Use BF=287                     for nominal HFE
*Use BF={287*1.73}              for maximum HFE
Rb b b1 0.01
Q1 c b1 e Qnss1c301t4g2
* Model generated on Sep 21, 11
* MODEL FORMAT: PSpice
.MODEL Qnss1c301t4g2 npn
+IS=1.21674e-11
+BF=287
*+IS=1.21674e-11
*+BF=287
+NF=1.13047 VAF=14.6607
+IKF=4.31072 ISE=3.25335e-12 NE=3.53101 BR=5.00076
+NR=1.19574 VAR=6.23931 IKR=5.86862 ISC=6.25001e-13
+NC=3.9375 RB=1.8106 IRB=0.1 RBM=0.1
+RE=0.000711316 RC=0.0436544 XTB=0.786033 XTI=1.10401
+EG=1.05 CJE=7.68935e-10 VJE=0.99 MJE=0.387949
+TF=1.13993e-09 XTF=1000 VTF=1327.51 ITF=95.3145
+CJC=9.37254e-11 VJC=0.95 MJC=0.450276 XCJC=1
+FC=0.8 CJS=0 VJS=0.75 MJS=0.5
+TR=1e-07 PTF=0 KF=0 AF=1
.ends
.subckt ZXTN619MA 1 2 3
*Use BF={465/2}                 for minimum HFE
*Use BF=465                        for nominal HFE
*Use BF={465*2}                 for maximum HFE
Q1 1 2 3 ZXTN619MA
*ZXTN619MA Spice model
*SIMULATOR=SIMETRIX
*ORIGIN=PH
*DATE=09April2019
*VERSION=2
*#SIMETRIX
.Model          ZXTN619MA   NPN
+               IS =        5.8032E-13
+               NF =        1.02
+               ISE =       1.5933E-13
+               NE =        1.4148
+               BF =        465
+               IKF =       8
+               NK =        0.8
+               VAF =       84
+               NR =        1.0006
+               ISC =       5E-12
+               NC =        1.6
+               BR =        110
+               IKR =       1.4
+               VAR =       51
+               RB =        14.5
+               IRB =       8.00E-06
+               RBM =       0.2
+               RE =        0.05
+               RC =        0.0375
+               CJE=        2.17E-10
+               VJE =       0.75
+               MJE =       0.33
+               CJC =       4E-11
+               VJC =       0.4347
+               MJC =       0.3708
+               XCJC =      1
+               CJS =       0
+               VJS =       0.75
+               MJS =       0
+               TF =        780.0E-12
+               XTF =       0
+               VTF =       1E+20
```

-continued

```
+ ITF = 0
+ PTF = 0
+ TR = 9.00E-09
+ XTB = 1.3
+ XTI = 3
+ RCO = 0
+ TRB1 = 0
+ TRB2 = 0
+ TRC1 = 0
+ TRC2 = 0
+ TRE1 = 0
+ TRE2 = 0
+ TRM1 = 0
+ TRM2 = 0
* T_ABS =
+ T_MEASURED =27
* T_REL_GLOBAL =
+ QUASIMOD = 1
+ CN = 2.42
+ D = 0.87
+ FC = 0.5
+ EG = 1.11
+ GAMMA = 1E-11
+ ISS = 0
+ NS = 1
+ QCO = 0
+ AF = 1
+ KF = 0
+ VG = 1.206
+ VO = 10
* (c) 2019 Diodes Inc
*
* The copyright in these models and the designs embodied belong
* to Diodes Incorporated (" Zetex "). They are supplied
* free of charge by Zetex for the purpose of research and design
* and may be used or copied intact (including this notice) for
* that purpose only. All other rights are reserved. The models
* are believed accurate but no condition or warranty as to their
* merchantability or fitness for purpose is given and no liability
* in respect of any use is accepted by Diodes Incorporated, its distributor
* or agents.
*
* Diodes Zetex Semiconductors Ltd, Zetex Technology Park, Chadderton,
* Oldham, United Kingdom, OL9 9LL
.ends
.subckt ZXTN620MA 1 2 3
Q1 1 2 3 ZXTN620MA
*Use BF={480/1.5} for minimum HFE
*Use BF= 480 for nominal HFE
*Use BF={480*1.5} for maximum HFE
*DIODES_INC_SPICE_MODEL
*ORIGIN=DZSL_DPG_GM
*SIMULATOR=PSPICE
*DATE=27JAN2011
*VERSION=1
*
.MODEL ZXTN620MA NPN IS =6.5E-13 BF ={480*1.0} NF=1.003 VAF=150 IKF=1.5
+ISE=2.00E-13 NE=1.42 BR=180 NR=1.0015 VAR=55 IKR=1 ISC=4.00E-12
+NC=1.3 RB=0.04 RE=0.048 RC=0.065 CJE=2.13E-10 CJC=3.30E-11 VJC=0.48
+MJC=0.41 TF =9E-10 TR=3.5E-8
*
*
.ends
.subckt ZXTN25100DG 1 2 3
*Use BF={550/1.5} for minimum HFE
*Use BF= 550 for nominal HFE
*Use BF={550*1.5} for maximum HEE
Q1 1 2 3 ZXTN25100DG
.MODEL ZXTN25100DG NPN IS=6E-13 NF=1 BF=550 IKF=4 VAF=117 ISE=1.3E-13
+ NE=1.42 NR=1 BR=35 IKR=1 VAR=36 ISC=5E-13 NC=1.18 RB=0.2 RE=0.0013
+ RC=0.0016 CJC=28E-12 MJC=0.3 VJC=0.4 CJE=182E-12 MJE=0.39 VJE=0.78
+ TF=7.5E-10 TR=5.3E-8 XTB=1.4 TRC1=.005 TRB1=.005 TRE1=.005 QUASIMOD=1
+ RCO=7 GAMMA=8.3E-8
*
*
.ends
.subckt FZT855 1 2 3
Q1 1 2 3 FZT855
```

-continued

```
*Use BF={240/2.0}                    for minimum HFE
*Use BF= 240                         for nominal HFE
*Use BF={240*2.0}                    for maximum HFE
*ZETEX FZT855 Spice Model v2.0 Last Revised 24/2/05
*
.MODEL FZT855 NPN IS =7.5E-13 BF ={240} NF=0.995 VAF=350 ISE=4E-13
+NE=1.42 GAMMA=8E-8 RCO=2 XTB=1.4 BR=27 NR=1.0015 VAR=140 ISC=8E-12
+NC=1.3 RB=0.15 RE=0.018 RC=0.018 CJE=4.2E-10 CJC=6.6E-11 VJC=0.48
+MJC=0.41 TF =1.5E-9 TR=18E-8 QUASIMOD=1
*
.ends
.subckt ZXT1053AK 1 2 3
Q1 1 2 3 ZXT1053AK
*ZETEX ZXT1053AK Spice Model v1.0 Last Revised 08/03/06
*Use BF=500                          for minimum HFE
*Use BF=763                          for nominal HFE
*Use BF=2800                         for maximum HFE
.MODEL ZXT1053AK NPN IS=2.1E-12 NF=1.0 BF=760 IKF=2.2 VAF=100
+                                    ISE=0.9E-13 NE=1.25 NR=0.99 BR=150 IKR=2.5 VAR=15
+                                    ISC=5.0E-10 NC=1.76 RB=0.1 RE=0.028 RC=0.016
+                                    CJC=75.1E-12 CJE=520E-12 MJC=0.415 MJE=0.367
+                                    VJC=0.512 VJE=0.766 TF=550E-12 TR=22E-9
*
*
.ends
* RB501 Schottky diode
*
.model RB501VM-40 D(Is=825.5n N=1.059 Rs=1.187 Ikf=13.61 Xti=2 Eg=.55 Cjo=20.268p
M=442.8m Vj=579.28m Isr=200.54n Nr=1.1 Bv=45 tt=14.7n Iave=0.1 Vpk=45 mfg=Rohm
type=Schottky)
* DS186 Lumiled LED
*
.model DS186 D(Is=4e-13 Rs=.125 N=3.8 Eg=3.0 Cjo=1.2n Xti=13 Iave=1.6 Vpk=5
+ mfg=Lumileds type=LED)
```

Figure 13:
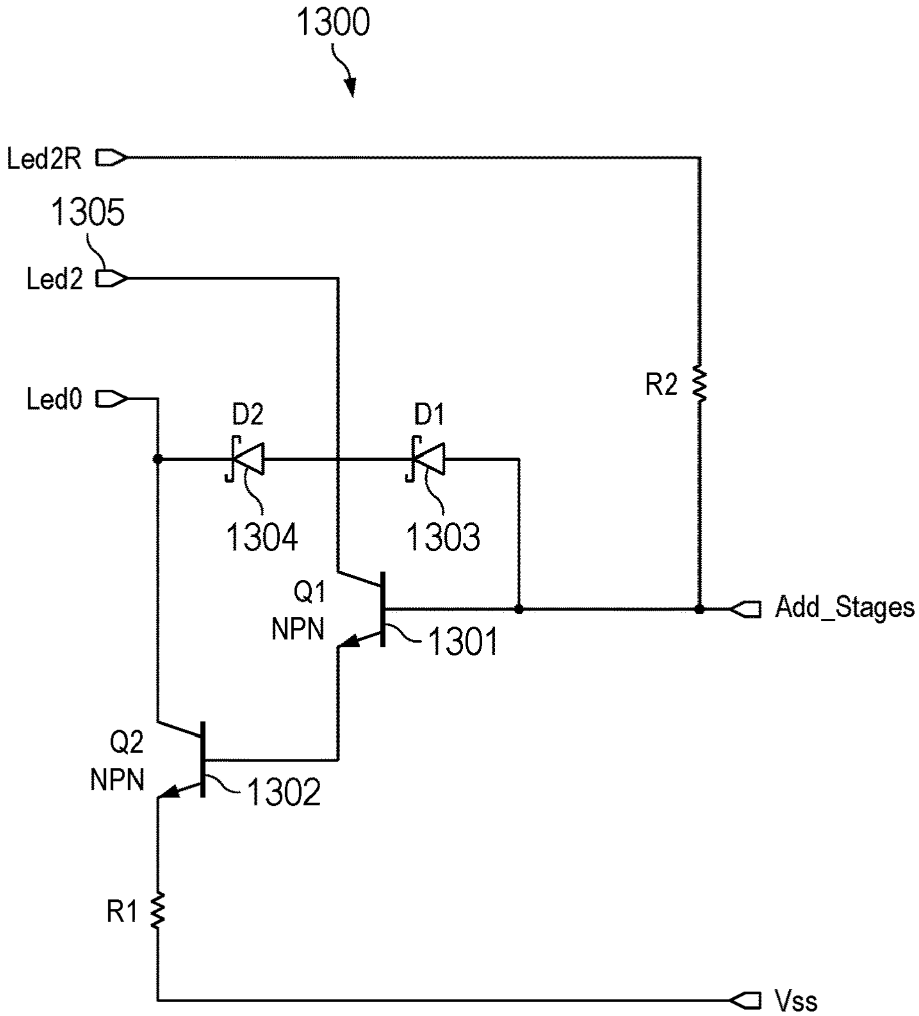
FIG. 13 is a circuit diagram illustrating a low-power current-matching circuit using a Darlington configuration.
Figure 14A:
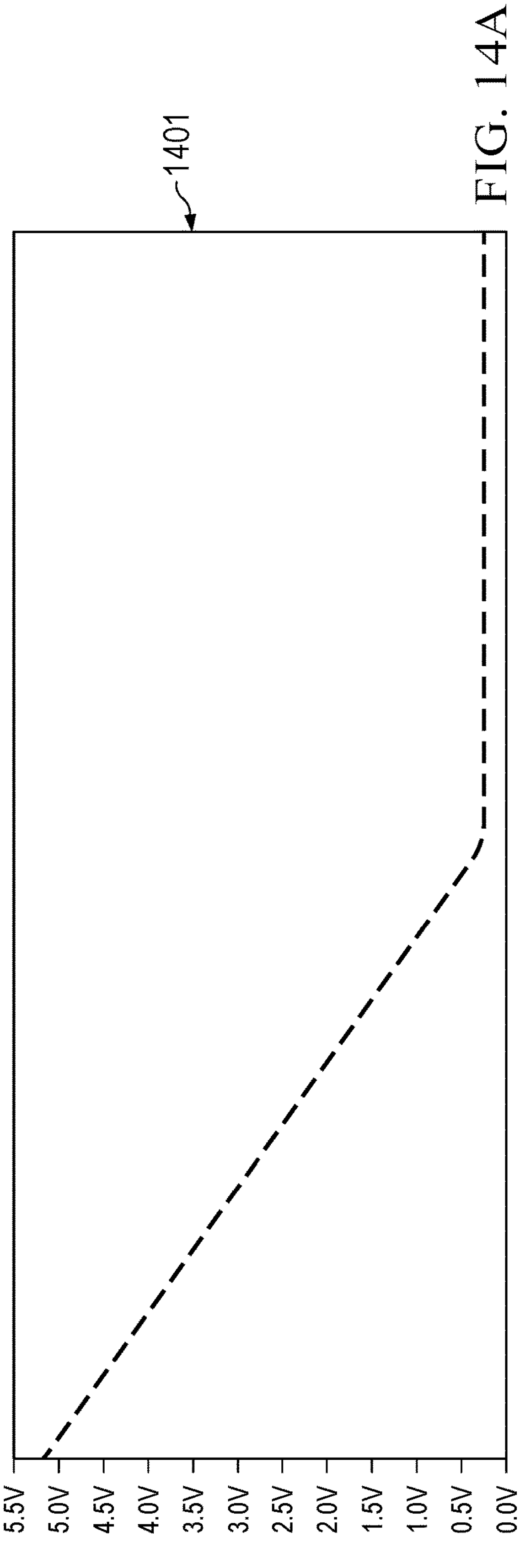
FIGS. 14A-14D are a set of graphs showing the voltage and current performance of a single branch of the circuit of FIG. 13.
Figure 14B:
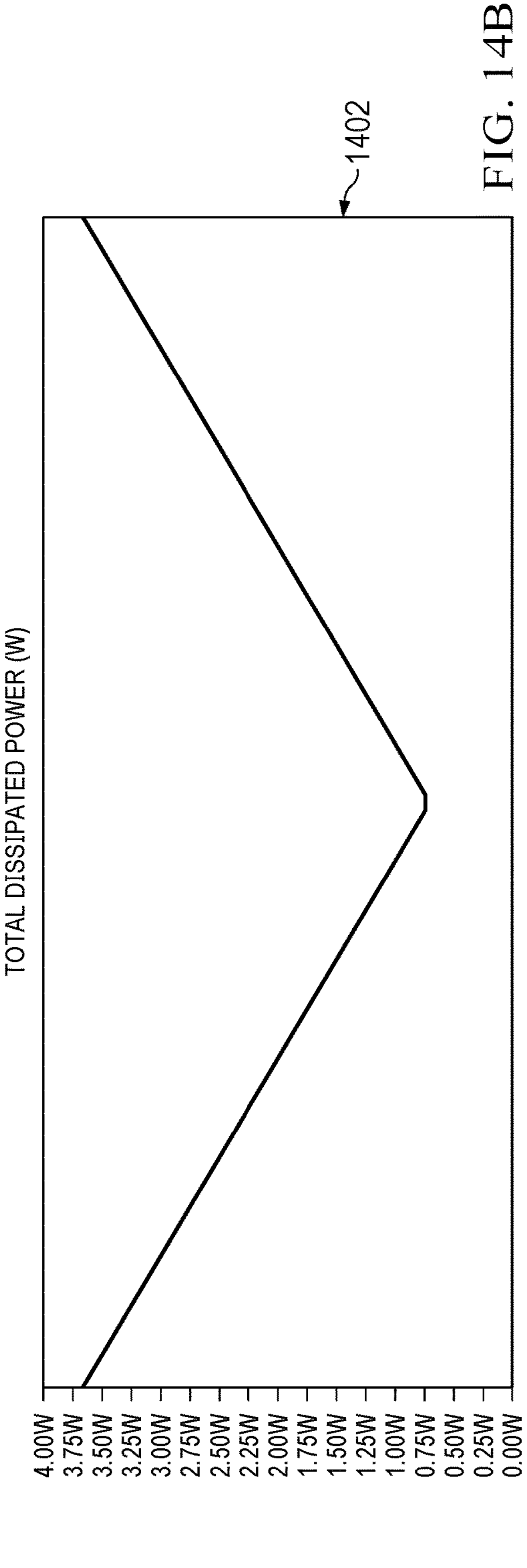
Figure 14C:
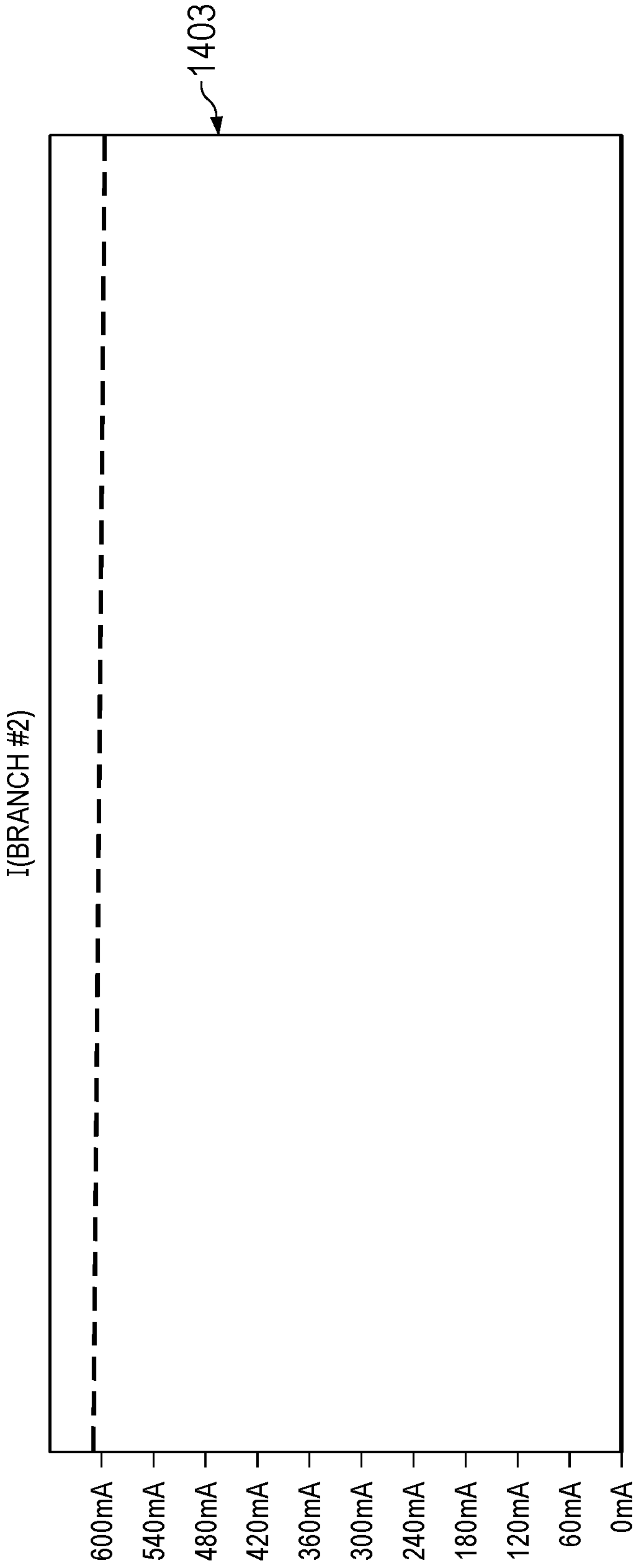
Figure 14D:
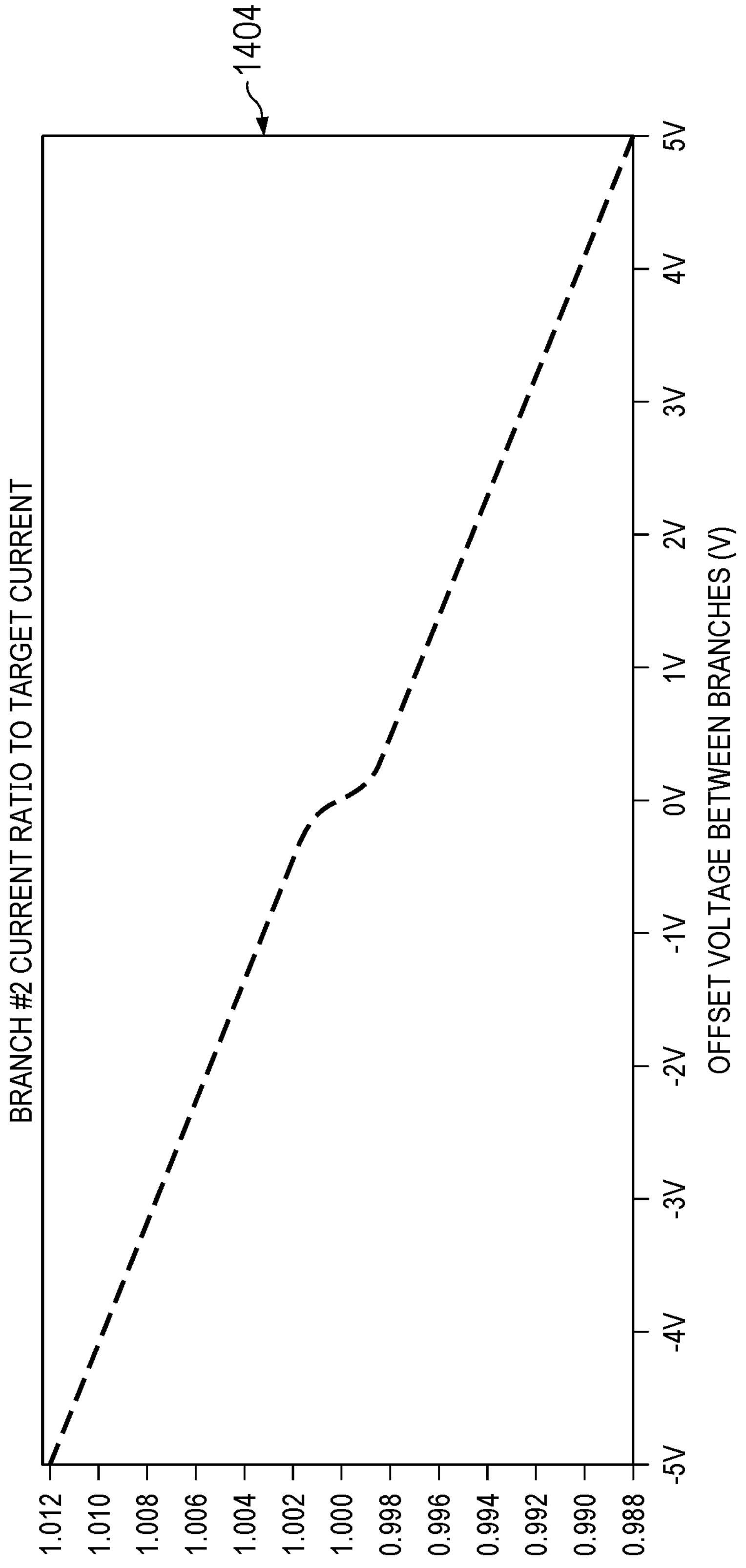

FIG. 13 discloses an equivalent circuit of the previous disclosed embodiments (one branch shown only) 1300 using a Darlington configuration made with Q1 1301 driving the base of Q2 1302. The Darlington approach offers the benefit of elevated gains (typically HFE1×HFE2) and if the speed of the transistors is sufficient, no penalty is seen in switching. In this configuration it is best to connect Q1's 1301 collector to the Nth LED instead of Q2's 1302 collector in order to reduce Q2's 1302 collector voltage, thus the DC power consumed by Q2 1302. As seen in FIG. 13, it is connected above the second LED 1305 as an example. As long as the collector voltage tolerance of Q1 1301 is maintained, any appropriate higher voltage than $V_c$(Q2) 1302 can be used. D1 1303 and D2 1304 can be used instead of a single transistor following the same principle because when the worst case forward current (i.e., worse voltage matching) flows through D1 1303 and D2 1304, the collector voltage of Q2 1304 is still in the plateau region, away from saturation. Typically, this would be on the order of 0.3V but can be adjusted generally between 0.050V-0.60V either for a Darlington configuration or a single transistor configuration.

The graphs 1401 to 1404 of FIG. 14A-D shows the voltage and current performance of a single branch of the circuit of FIG. 13. The graphs of FIGS. 14A-D shows the typical performance of an integrated 2-branch circuits of FIGS. 13 and 17. In an exemplary embodiment, the invention uses DS186 white LEDs and was target for 600 mA/string (1200 mA total). The internal resistors were selected for optimal operation near 350 mA such that and additional parallel ($R_{parallel}$) resistor was used at 600 mA. Graph 1401 shows the collector voltage on branch 2 as an additional offset voltage is added to branch 2. If that additional voltage is negative then it results in a proportional increase in branch 2 voltage as the collector voltage in Branch 1 is fixed around 0.25V. Similarly, when the offset voltage is positive, branch 2's collector voltage is pinned at around 0.25V. Branch 1 voltage is complementary to Branch 2 voltage meaning that it is mirrored on the Y-axis. An ideal current mirror would should show 0V on the positive offset voltage and would increase linearly on the negative voltage axis with a slope of 1:1. The invention of FIG. 13 shows ideal behavior but for an offset of about 0.25V across the entire range of voltages shown.

Graph 1402 shows the total power dissipated by the invention of FIG. 13 is about 0.75 W when balanced and symmetrically increases at a rate of about 0.6 W/V (0.6 A/branch). An ideal current splitter would start at (0,0) and increase linearly with a slope of 0.6 W/V. As noted, the disclosed invention is only consuming 0.75 W more than an ideal linear current splitter.

Graph 1403 shows the actual branch 2 current on a linear scale so that the current mirroring performance can be seen.

Graph 1404 shows the fraction of the total ideal current (600 mA) passing through branch 2 as the circuit reacts to variable voltage imbalance from −5V to +5V. The average slope is about 0.24%/V (1.2%/5V) so this system is typically performing within 1% of expect current when dividing.

Figure 15:
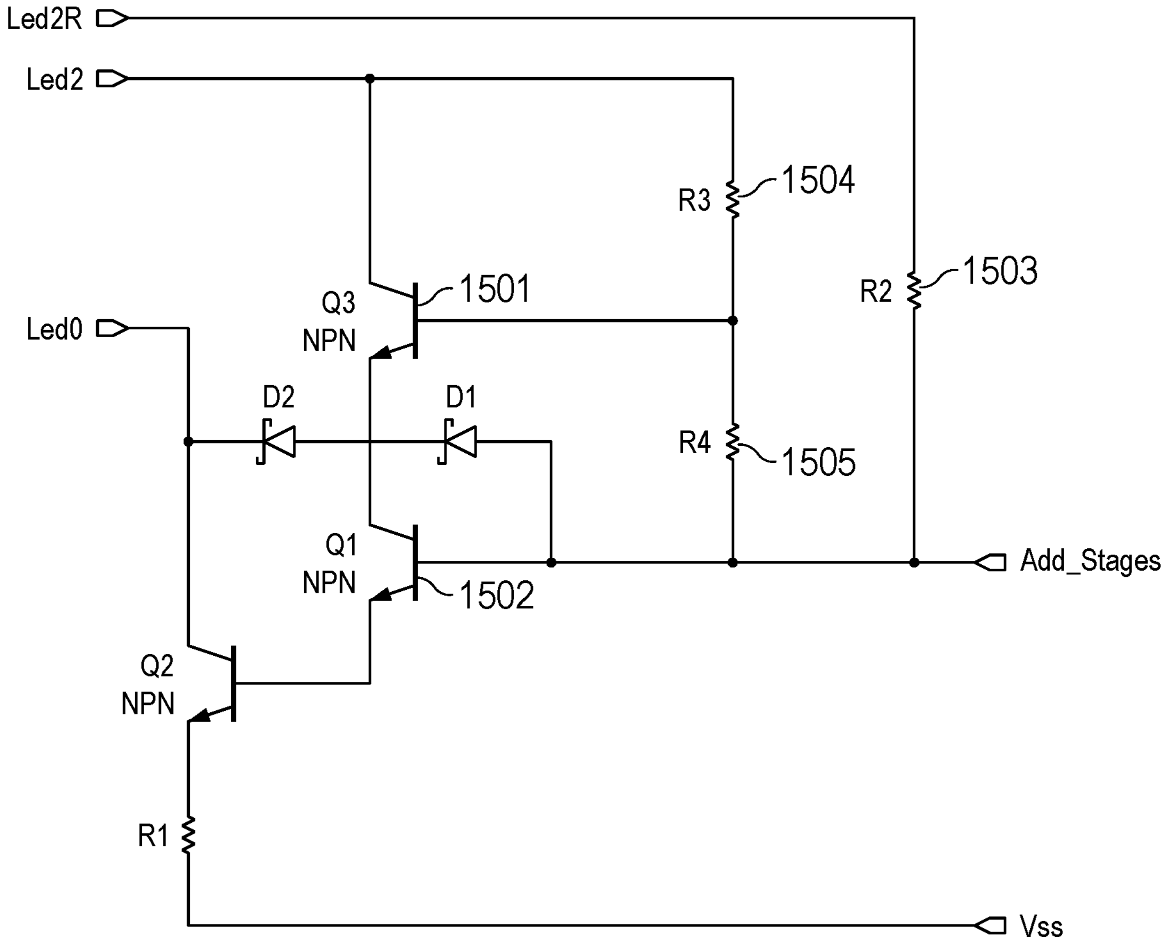
FIG. 15 is a circuit diagram illustrating a low-power current-matching circuit using a Darlington configuration with an additional cascode transistor.

FIG. 15 discloses a similar Darlington configuration but uses an additional (cascode) transistor (Q3) 1501 to help in the case where the collector voltage of Q1 1502 could be exposed to higher voltages than desired. Resistors R2 1503, R3 1504 and R4 1505 are appropriately chosen to ensure that both Q3 1501 and Q1 1502 are properly biased across temperature and gain extremes.

Figure 16:
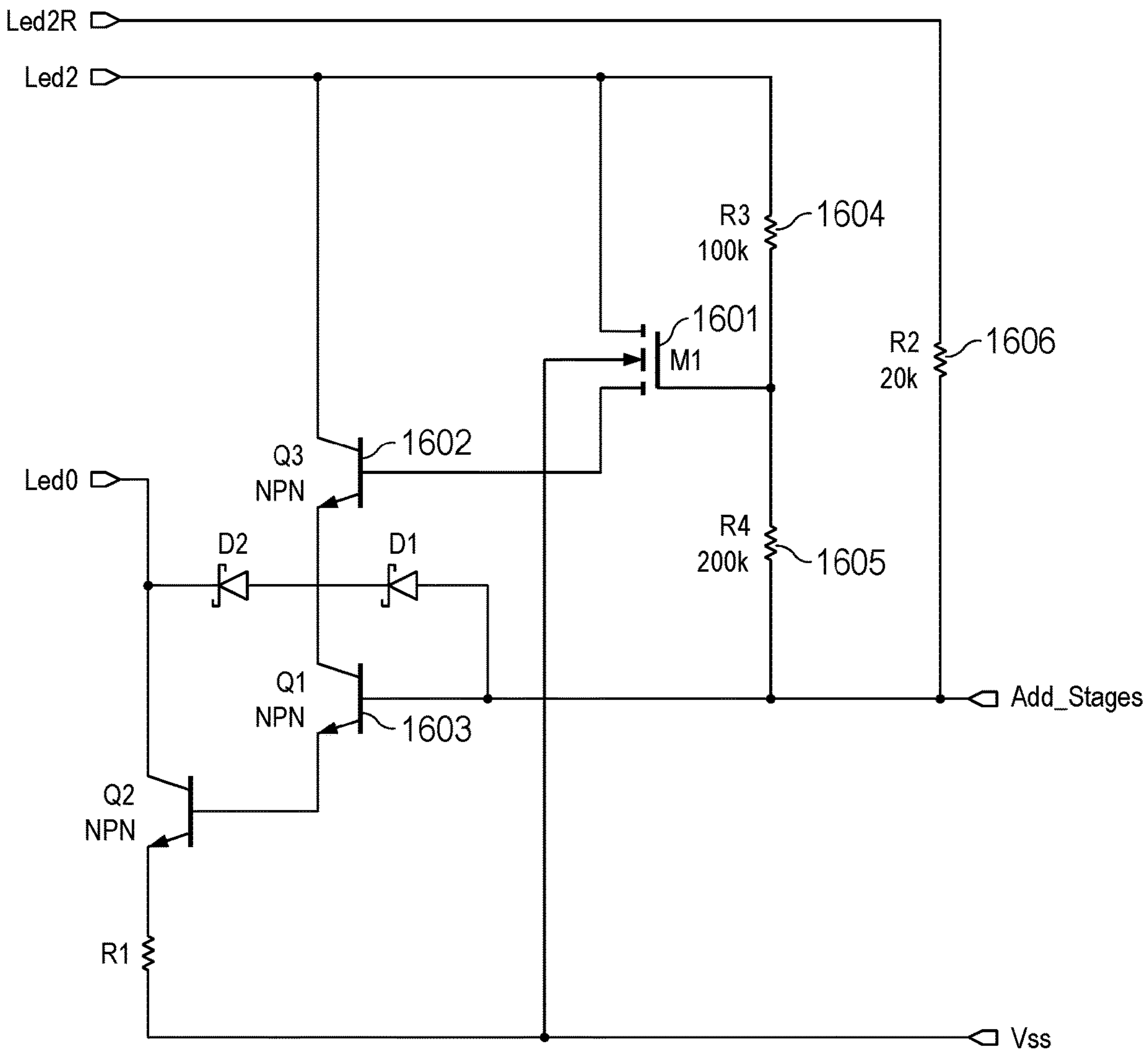
FIG. 16 is a circuit diagram illustrating a low-power current-matching circuit using a Darlington configuration using an NMOS transistor.

FIG. 16 shows a further similar Darlington configuration where an NMOS transistor 1601 ensures sufficient base current to Q3 1602 without impeding on the base current requirements for Q1 1603 now covered by resistors R3-R4 1604, 1605 and R2 1606. In the circuit of either FIG. 15 or 16 the ratio of resistors R3/(R3+R4) is chosen to ensure proper voltage across Q1 1603 and Q3 1602 collectors.

Figure 17:
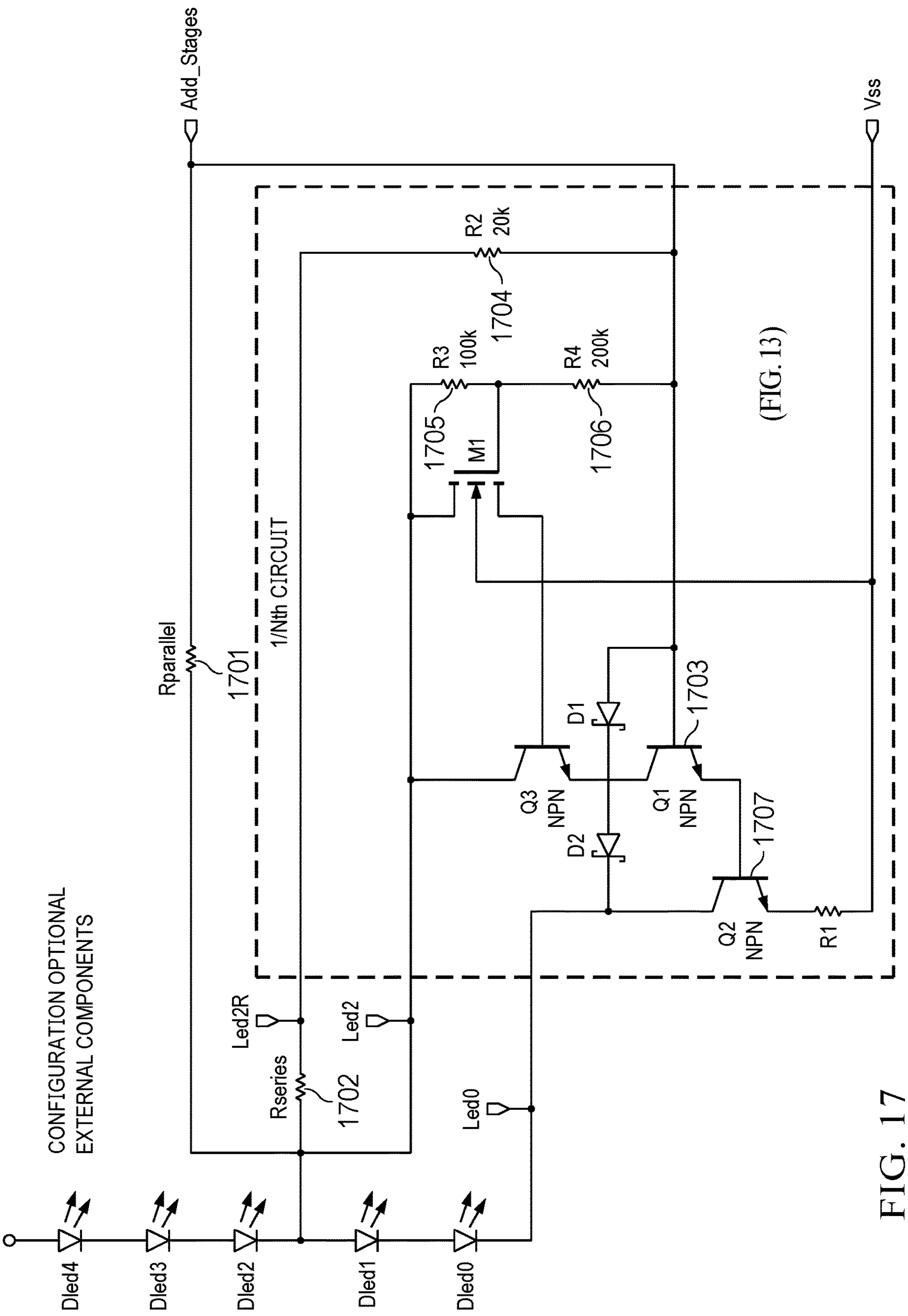
FIG. 17 is circuit diagram of a current dividing circuit diagram formed in an integrated circuit with external resistors.

FIG. 17 discloses an embodiment where the current dividing circuit (one leg shown) is formed in an integrated circuit and external resistors 1701, 1702 ($R_{parallel}$ and $R_{series}$) are used to bias the Darlington base of Q1 1703 with an appropriate current allowing the circuit to offer optimized operation for set currents as typically expected in PWM applications. For example, if the use of R2 1704 in parallel with R3 1705 and R4 1706 is optimal for a certain Q2 1707 collector current, the optimal current can be increased by adding $R_{parallel}$ 1701 with some chosen value such as to increase the base current in Q2 1707. Likewise, if the optimal current needs to be decreased an appropriate $R_{series}$ resistor 1702 can be selected such that the Q2's 1707 collector is constant across the range of expected operating and/or manufacturing conditions. As can be seen, FIG. 17 is a superset of the circuit of FIG. 13 which is embedded therein.

The disclosed invention can also be implemented in a system of M strings if instead of tying resistors to the Nth LED of each string, those resistors (or a single one of parallel equivalent value) are tied from a fix power supply (e.g., 2-8 Volts) in order to generate a bias current sufficient to ensure operation across the entire condition range (low/high HFE, low/high temperature).

The embodiments shown and described above are only exemplary. Even though numerous characteristics and advantages of the invention have been set forth in the foregoing description, the disclosure is illustrative only and changes may be made within the principles of the invention to the full extent indicated by the broad general meaning of the terms used herein. Various alterations, modifications and substitutions can be made to the disclosed invention and the system that implements the invention without departing in any way from the spirit and scope of the invention

I claim:

1. A method of arranging circuit elements in a light emitting diode (LED) system comprising the step of:
- providing a primary circuit;
- coupling an error-detecting current splitter to the primary circuit;
- configuring N-branches from the primary circuit; and
- splitting currents from the primary circuit into the N-branches, the currents characterized by a pulse width modulation (PWM) signal at a base frequency in the kHz range.

2. The method of claim 1, further comprising the step of supplying current to each N-branch in a range of between 100 mA and 5 A.

3. The method of claim 1, wherein Nis 4.

4. The method of claim 2, wherein the current in each branch does not exceed 750 mA.

5. The method of claim 1, wherein the current through the primary circuit comprises approximately 2400 mA split into 4 branches of approximately 600 mA.

6. The method of claim 1, further comprising a current splitter stage in the primary circuit.

7. The method of claim 6, further comprising the steps of:
- arranging at least one NPN-type bipolar junction transistor (BJT) in the current splitter stage as a current mirror; and
- applying a bias current through a bias resistor to a base-emitter junction of each at least one NPN-type BJT.

8. The method of claim 7, further comprising the step of arranging each BJT of the current splitter stage in a cascode with an additional BJT amplifier.

9. The method of claim 7, further comprising coupling a diode element between a collector and emitter of each NPN-type BJT, wherein the current through the diode element reduces a corresponding NPN-type BJT base current until the corresponding NPN-type BJT base current reaches a base current required for a non-saturated BJT to drive the non-saturated BJT's corresponding load at a minimum possible voltage; wherein the diode element functionality performed by one selected from the group consisting of a diode, Schottky diode, PNP transistor and a p-channel MOSFET (PMOS) transistor.

10. A circuit, comprising:
- a primary circuit;
- N-branches from the primary circuit operable to split currents, the currents characterized by a pulse width modulation (PWM) signal at a base frequency in the kHz range; and
- each of the N-branches comprising a load to receive the current split to such branch,
- further comprising a plurality of NPN-type bipolar junction transistors (BJTs) arranged in the current splitter stage as current mirrors; and a bias resistor coupled to a base-emitter junction of each NPN-type BJT.

11. The circuit of claim 10, wherein the BJTs in the current splitter stage are cascoded.

12. The circuit of claim 10, further comprising the load being at least one light emitting diode (LED) operable to receive current in a range of between 100 mA and 5 A.

13. The circuit of claim 10, wherein N is 4.

14. The circuit of claim 13, wherein the current in each branch does not exceed 750 mA.

15. The circuit of claim 10, wherein the current through the primary circuit comprises approximately 2400 mA split into 4 branches of approximately 600 mA.

16. A circuit, comprising:
- a primary circuit;
- N-branches from the primary circuit operable to split currents, the currents characterized by a pulse width modulation (PWM) signal at a base frequency in the kHz range;
- each of the N-branches comprising a load to receive the current split to such branch; and
- further comprising an error-detecting current splitter coupled to the primary circuit.

17. A circuit, comprising:
- a primary circuit;
- N-branches from the primary circuit operable to split currents, the currents characterized by a pulse width modulation (PWM) signal at a base frequency in the kHz range, each of the N- branches comprising a load to receive the current split to such branch;
- the primary circuit further comprising:
- a current splitter stage in the primary circuit;
- at least one NPN-type bipolar junction transistor (BJT) arranged in the current splitter stage as a current mirror;
- a bias resistor coupled to a base-emitter junction of each at least one NPN-type BJT; and
- a diode element coupling a collector and emitter of each at least one NPN-type BJT, wherein the current through the diode element reduces a corresponding NPN-type BJT base current until the corresponding NPN-type BJT base current reaches a base current required for a non-saturated BJT to drive the non-saturated BJT's corresponding load at a minimum possible voltage.

18. The circuit of claim 17, wherein sufficient forward current through the diode element causes the diode's corresponding NPN-type BJT to operate in saturation mode.

19. The circuit of claim 17 wherein a functionality of the diode element is performed by one selected from the group consisting of a diode, Schottky diode, PNP transistor and a p-channel MOSFET (PMOS) transistor.

20. A method of arranging circuit elements in a light emitting diode (LED) system comprising the step of:

providing a primary circuit;

coupling an error-detecting current splitter to the primary circuit, wherein the current splitter is comprised of transistors arranged in a Darlington configuration;

configuring N-branches from the primary circuit; and splitting currents from the primary circuit into the N-branches, the currents characterized by a pulse width modulation (PWM) signal at a base frequency in the kHz range.

21. The method of claim 20, wherein the Darlington configuration comprises a first NPN-type bipolar junction transistor (BJT) coupled to a second NPN-type BJT such that an emitter of said first NPN-type BJT is connected to a base of said second NPN-type BJT, thereby effectively multiplying the current gains of the two BJTs;

the Darlington configuration further comprising a common connection between collectors of said first NPN-type BJT and second NPN-type BJT, said common connection comprising an electrical load having a resistance such that a collector voltage of said second NPN-type BJT is lower than a collector voltage of said first NPN-type BJT.

22. The method of claim 21, wherein said current splitter further comprises a third NPN-type BJT coupled to said Darlington configuration in a cascode, an emitter of said third NPN-type BJT being connected to the collector of said first NPN-type BJT and bases of said first NPN-type BJT and third NPN-type BJT being connected across a first bias resistor; the collector and base of said third NPN-type BJT being connected across a second bias resistor.

23. The method of claim 22, wherein said current splitter further comprises an n-channel metal-oxide semiconductor field-effect transistor (MOSFET) having a drain terminal of the n-channel metal-oxide semiconductor field-effect transistor (MOSFET) coupled to the collector of said third NPN-type BJT, a source terminal of the n-channel metal-oxide semiconductor field-effect transistor (MOSFET) coupled to the base of said third NPN-type BJT, and a gate terminal of the n-channel metal-oxide semiconductor field-effect transistor (MOSFET) coupled to the base of said first NPN-type BJT across said first bias resistor; the drain and gate terminals of the n-channel metal-oxide semiconductor field-effect transistor (MOSFET) being further connected across said second bias resistor.

24. The method of claim 23, further comprising the step of adding external bias resistors between a collector of said third NPN-type BJT and the base of said first NPN-type BJT such that the collector current of said second NPN-type BJT is tuned.

* * * * *